United States Patent
Li et al.

(10) Patent No.: US 9,893,633 B1
(45) Date of Patent: Feb. 13, 2018

(54) MODULAR MULTILEVEL DC-DC CONVERTER AND ASSOCIATED METHOD OF USE

(71) Applicant: The Florida State University Research Foundation, Inc., Tallahassee, FL (US)

(72) Inventors: Hui Li, Tallahassee, FL (US); Yuxiang Shi, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 15/467,738

(22) Filed: Mar. 23, 2017

Related U.S. Application Data

(60) Provisional application No. 62/312,194, filed on Mar. 23, 2016, provisional application No. 62/397,029, filed on Sep. 20, 2016.

(51) Int. Cl.
*H02M 3/335* (2006.01)
*H02M 1/32* (2007.01)
(Continued)

(52) U.S. Cl.
CPC ....... *H02M 3/33546* (2013.01); *H02M 1/083* (2013.01); *H02M 1/14* (2013.01); *H02M 1/32* (2013.01)

(58) Field of Classification Search
CPC ... H02M 2001/0067; H02M 2001/007; H02M 2001/0074; H02M 2001/0077; H02M 3/335
(Continued)

(56) References Cited

U.S. PATENT DOCUMENTS

2011/0198936 A1* 8/2011 Graovac ................ H02M 7/79
307/82
2013/0099572 A1* 4/2013 Norrga ................. H02M 3/335
307/43

OTHER PUBLICATIONS

Thomas et al., Development of a Modular High-Power Converter System for Battery Energy Storage Systems. Proceedings of the 2011-14th European Conference on Power Electronics and Applications (EPE 2011). 2011: 1-10.
(Continued)

*Primary Examiner* — Jeffrey Sterrett
(74) *Attorney, Agent, or Firm* — Molly L. Sauter; Smith & Hopen, P.A.

(57) ABSTRACT

In one embodiment, a current-fed modular multilevel dual active-bridge DC-DC converter suitable for medium voltage direct current (MVDC) grid or high voltage direct current (HVDC) grid integration is described. The DAB modular converter and the current-fed DAB converter are soft-switched modular multilevel dual-active-bridge (DAB) converters having DC fault ride-through capability. In an additional embodiment a voltage-fed isolated modular dual active-bridge DC-DC converter for medium voltage direct current (MVDC) or high voltage direct current (HVDC) grids or systems is described. In specific embodiments, the converters may be coupled to a battery energy storage system (BESS), wherein the BESS comprises split-battery units and the interface of the isolated DC-DC converter connects the split-battery units to the MVDC or HVDC system. The converters can be implemented in single-phase or poly-phase configurations and can be controlled to maintain a desired DC output current under both normal and DC grid fault condition.

20 Claims, 31 Drawing Sheets

(51) Int. Cl.
*H02M 1/14* (2006.01)
*H02M 1/08* (2006.01)

(58) Field of Classification Search
USPC .................. 363/17, 43, 65, 67, 71, 89, 98
See application file for complete search history.

(56) References Cited

OTHER PUBLICATIONS

Mo et al., Isolated Modular Multilevel (IMM) DC-DC Converter With Energy Storage and Active Filter Function for Shipboard MVDC System Applications. 2015 IEEE Electric Ship Technologies Symposium (ESTS). 2015: 1-5.

\* cited by examiner

MODULAR MULTILEVEL DC-DC CONVERTER AND ASSOCIATED METHOD OF USE

CROSS-REFERENCE TO RELATED APPLICATIONS

This application claims priority to U.S. Provisional Patent Application No. 62/312,194 entitled, "A Modular Multilevel Dual-Active-Bridge DC-DC Converter for Battery Energy Storage Applications in DC Grids", filed on Mar. 23, 2016 and U.S. Provisional Patent Application No. 62/397,029 entitled, "Current-Fed Modular Dual-Active-Bridge Dc-DC Converter And Method Of Use", filed on Sep. 20, 2016, both of which are incorporated by reference in their entirety.

GOVERNMENTAL SUPPORT

This invention was made with government support under Grant Number N00014-14-1-0198 awarded by United States Navy Office of Naval Research. The government has certain rights in the invention.

FIELD OF INVENTION

The present invention relates to a modular multilevel DC-DC converter that is galvanically isolated, and its various embodiments suitable for DC grids interconnection and BESS DC grid integration. Furthermore, the present invention relates to modulation and control method for operating the DC-DC converter with soft-switching and DC fault ride-through capability.

BACKGROUND OF THE INVENTION

Due to simplicity and high efficiency, multilevel DC-DC converter systems are finding increasing applications in modern power systems, such as DC collector grids in large-scale offshore wind farms, photovoltaic (PV) plants and shipboard power systems (SPS).

As the interface, the high-voltage, high-power DC-DC converter is a key enabling technology in MIN/DC (medium voltage direct current) systems. Galvanic isolation is generally required in the DC-DC converters, not only for safety reasons, but also to establish a high voltage conversion ratio. In the DC-DC converters, high efficiency and high power density are desired, especially for SPS.

Furthermore, since the medium-voltage DC circuit breakers are not yet readily available for high power levels, the DC fault clearing has become a critical challenge in MVDC systems. As an alternative approach, a fast DC fault clearance process based on coordinated control of power converters and a mechanical contactor have been presented in the prior art. In the prior art process, the DC fault is detected by power converters, and then the fault segment is located through a differential protection scheme with assistance from the power converters. After the fault segment has been located, the system is fully dc-energized to isolate the fault segment, and then the system is re-energized for recovery. The key to such a coordinated fault management system is the power converter, which not only limits, but also provides for a controlled DC fault current, and as such, exhibits DC fault ride-though capability.

Dual-active-bridge (DAB) DC-DC converters are known in the art, including input-series output-parallel (ISOP) DAB DC-DC converters, which have the advantage of high efficiency due to zero-voltage-switching (ZVS) operation, and which exhibit high power density, high frequency isolation, and low device number. However, the DAB DC-DC converters currently known in the art lack DC fault ride-through capability and inject extra fault current as a result of the discharging of output capacitors when a DC fault occurs. The DAB concept has also been extended for modular structure, however, while the known converter can isolate a DC fault, it cannot provide controllable DC fault current.

Isolated modular multilevel DC-DC converters (IM-MDC), consisting of two modular multilevel converters (MMC) in front-to-front configuration through a transformer are also known in the art. Based on MMC, the IMMDC exhibits good performance under DC fault, and the size and volume of the passive components may be reduced with medium-frequency operation. However, the limitation of this known IMMDC converter is the relatively low efficiency and low power density, resulting from high switching loss and conduction loss.

For wind and PV generation, large power fluctuations and energy variations are unavoidable, which deteriorates the grids stability and has become a major barrier for their high penetration of the technology. Similarly, in MVDC distribution systems, there are a wide variety of loads, including high power propulsion loads and pulsed loads. These loads introduce a large amount of pulsed and ripple current in a wide frequency range, which may cause voltage oscillations on the MVDC system. In these applications, energy storage is essential to smooth the power fluctuations and to stabilize the grid.

Batteries offer unique and scalable energy storage solutions for high-power and long-term energy demands in the power range of up to several hundred megawatts. At the interface between the battery energy storage and the MVDC bus, the BESS (battery energy storage system) converter is a key enabling technology and is required to operate in both high voltage and high power ratings. Galvanic isolation is additionally required, not only for safety reasons, but also to provide a high voltage conversion ratio. In addition, due to the relatively high cost and limited cyclic life of battery units, the BESS converter must be highly efficient in order to maximize the utilization of the battery. Moreover, as DC circuit breakers are not yet readily available for high power conditions, it is desirable that the BESS converters provide good DC fault responses to lead to a more secure and robust power transport providing inherent fault protection and DC fault ride-through capabilities.

Conventional BESSs are mainly focused on AC systems, where a line frequency transformer is usually used as an interface to medium voltage or high voltage AC grids, thus the conventional BESSs known in the art are not suitable for medium voltage or high voltage DC grid applications. Several attempts at modular BESS converters for a DC grid have been made, however they do not meet all the requirements mentioned above.

Cascaded dual-active-bridge (DAB) BESS converters are known in the art and have the advantage of a small number of devices and soft-switching operation. However, the cascaded dual-active-bridge (DAB) BESS converters known in the art lack fault ride-through capability and will inject extra fault current, as a result of the output capacitors, when a DC fault occurs. An isolated modular multilevel DC-DC converter (iMMDC) is also known in the art for BESS in MVDC applications in which DC fault ride-though is achieved by the MMC stage on the MVDC side. Although the reactive components can be reduced with medium frequency operation, the converter does not provide soft-switching operation and also utilizes a large number of switches, resulting in a potential and efficiency penalty.

Accordingly, what is needed in the art is a modular multilevel DC-DC converter that is galvanically isolated and which incorporates control methods for operating the converter to employ soft-switching and DC fault ride-though capability.

SUMMARY OF INVENTION

In various embodiments, the present invention provides a high efficiency isolated DC converter connected to MVDC or HVDC grids or systems. In general, the converter interface of the present invention includes a single-phase or poly-phase transformer with primary windings connected to primary side and secondary windings connected to secondary side. In various embodiments, the present invention provides implementation of a current-fed modular dual active-bridge DC-DC (CF-MDAB) converter and a voltage-fed modular dual active-bridge DC-DC (VF-MDAB) converter. In a particular embodiment, the CF-MDAB and the VF-MDAB may be integrated with a battery energy storage system (BESS).

In one embodiment, the present invention proposes an isolated modular multilevel DC-DC converter based on current-fed DAB converter, i.e. CF-MDAB converter. The CF-DAB converter of the present invention may include a single-phase or poly-phase transformer with primary windings connected to primary side and secondary windings connected to secondary side. In both the primary and secondary, a plurality of phase units, comprising of upper arm, DC inductor and lower arm, are connected to DC grid at the DC terminal and connected to the transformer at the AC terminal. The arms are comprised of cascaded half-bridge submodules (HBSMs) and/or full-bridge submodules (FB-SMs) with integrated cell capacitors. Like DAB converter, the inventive CF-MDAB converter exhibits high flexibility in configuration, e.g. input-series output-parallel (ISOP) and input-series output-independent (ISOI) connection, and can be applied for battery energy storage system.

In a particular embodiment, the present invention provides a current-fed modular multi-level dual active-bridge (CF-MDAB) DC-DC converter which includes, a transformer comprising a primary winding and a secondary winding, an input stage having DC terminals coupled to a DC grid and AC terminals coupled to the primary winding of the transformer, wherein the input stage includes a plurality of primary phase units coupled in parallel, wherein each primary phase unit comprises at least one active primary switching arm having a plurality of cascaded cells and at least one center-taped DC inductor, and wherein each of the plurality of cascaded cells comprises a plurality of switching devices and at least one capacitor coupled across the DC terminals of the input stage and an output stage having DC terminals coupled to a DC grid and AC terminals coupled to the secondary winding of the transformer, wherein the output stage includes a plurality of secondary phase units coupled in parallel, wherein each secondary phase unit comprises a plurality of secondary switching arms having a plurality of cascaded cells and at least one center-taped DC inductor, and wherein each of the plurality of cascaded cells comprises a plurality of switching devices and at least one capacitor coupled across the DC terminals of the output stage. The CF-MDAB further includes a control system coupled to each of the plurality of switching devices of the input stage and the output stage, the control system including both hardware and software components interconnected to control the input stage and the output stage to control the plurality of switching devices in a soft-switched manner to convert DC voltages to multi-level AC voltages at selected frequencies, to operate the switching devices in a normal CF-MDAB operation mode by providing duty cycle regulation in a DC loop and by providing a phase shift regulation between the multi-level AC voltages at the primary winding and the secondary winding of the transformer in an AC loop and to realize DC fault ride-through operation under a DC grid fault.

In a specific embodiment of the CF-MDAB, each of the plurality of cascaded cells of the at least one primary switching arm and the plurality of secondary switching arms are configured as half-bridge cells or full-bridge cells. In this embodiment, the control circuit operates the switching devices of the full-bridge cells in a half-bridge mode during a normal CF-MDAB operation mode and the control circuit operates the switching devices of the full-bridge cells in full-bridge mode to realize a DC fault ride-through under a DC grid fault.

The present further provides a method for controlling a current-fed modular multi-level DC-DC (CF-MDAB) converter comprising a transformer comprising a primary winding and a secondary winding, an input stage having DC terminals coupled to a DC grid and AC terminals coupled to the primary winding of the transformer, wherein the input stage includes a plurality of primary phase units coupled in parallel, wherein each primary phase unit comprises at least one active primary switching arm having a plurality of cascaded cells and at least one center-taped DC inductor, and wherein each of the plurality of cascaded cells comprises a plurality of switching devices and at least one capacitor coupled across the DC terminals of the input stage, an output stage having DC terminals coupled to a DC grid and AC terminals coupled to the secondary winding of the transformer, wherein the output stage includes a plurality of secondary phase units coupled in parallel, wherein each secondary phase unit comprises a plurality of secondary switching arms having a plurality of cascaded cells and at least one center-taped DC inductor, and wherein each of the plurality of cascaded cells comprises a plurality of switching devices and at least one capacitor coupled across the DC terminals of the output stage and a control system coupled to each of the plurality of switching devices of the input stage and the output stage, the control system including both hardware and software components interconnected to control the input stage and the output stage: the method comprising, operating the control system to control the plurality of switching devices in a soft-switched manner to convert DC voltages to multi-level AC voltages at selected frequencies, to operate the switching devices in a normal CF-MDAB operation mode by providing duty cycle regulation in a DC loop and by providing a phase shift regulation between the multi-level AC voltages at the primary winding and the secondary winding of the transformer in an AC loop and to realize DC fault ride-through operation under a DC grid fault.

In a specific embodiment to realize DC fault ride-through operation of the CF-MDAB of the present invention, wherein each of the plurality of cascaded cells of the at least one primary switching arm and the plurality of secondary switching arms are configured as half-bridge cells or full-bridge cells. As such, the method further comprises operating the control system to operate the switching devices of the full-bridge cells in a half-bridge mode during a normal CF-MDAB operation mode and the control circuit operates the switching devices of the full-bridge cells in full-bridge mode to realize a DC fault ride-through under a DC grid fault.

In an additional embodiment, each of the cascaded cells of the at least one active primary arm of the CF-MDAB converter comprises a split-battery unit of a battery energy storage system (BESS) and wherein the control system further controls the split-battery unit to convert a DC voltage from the BESS to one or more multilevel AC voltages at one or more selected frequencies and the control system further controls the plurality of switching devices to provide a phase shift regulation between the one or more multilevel AC voltages at the primary winding and at the secondary winding of the transformer to yield a desired throughput.

With the present CF-MDAB converter modulation, the converter is operated in current-fed DAB mode, which has inherent ZVS condition, therefore can achieve high conversion efficiency. The low switching loss also enables high frequency operation of the converter which can significantly reduce the size and weight of passive components and improve the power density. Like IMMDC converter, the modular structure enables multilevel operation with reduced the dv/dt in the converter and avoids excessive discharging of capacitors for fast recovery under DC fault. With the presented direct current control, DC fault ride-through operation can be realized. In addition, the current stress in auxiliary switches and capacitors is much lower than that of the main switches in a submodule, allowing the use of low current rating device.

In an additional embodiment, the MDAB converter is a voltage-fed MDAB and in a particular embodiment, the converter is coupled to a battery energy storage system (BESS) to provide DC power to a DC power grid. Compared to cascaded DAB BESS converters, the present converter utilizes cell capacitors instead of output capacitors in the secondary, avoiding extra fault current injection from the converter and excessive discharging of capacitors under DC fault and enabling fast recovery for the BESS after the fault is cleared. Moreover, with the present control methods, DC fault ride-through operation can be achieved, and the current stress in the cell capacitors and auxiliary switches (in secondary side) is much lower than that of the main switches (in secondary side), allowing the use of low current rating switching devices. With the modular structure, multilevel operation can be realized to reduce the dv/dt during the commutation process, thus reduce the voltage stress in the converter.

In a particular embodiment, an voltage-fed modular multi-level DC-DC converter is provided which includes, a transformer comprising a primary winding and a secondary winding, an input stage having DC terminals coupled to a DC voltage source and AC terminals coupled to the primary winding of the transformer, wherein the input stage includes at least one active primary switching arm having a plurality of cascaded cells and wherein each of the plurality of cascaded cells comprises a plurality of switching devices and at least one capacitor coupled across the DC terminals of the input stage and an output stage having DC terminals coupled to a DC grid and AC terminals coupled to the secondary winding of the transformer, wherein the output stage includes a plurality of secondary switching arms having a plurality of cascaded cells and wherein each of the plurality of cascaded cells comprises a plurality of switching devices and at least one capacitor coupled across the DC terminals of the output stage.

The DC-DC converter further includes, a control system coupled to each of the plurality of switching devices of the input stage and the output stage, the control system including both hardware and software components interconnected to control the input stage and the output stage to control the plurality of switching devices to realize DC fault ride-through operation under a DC grid fault by operating in a rectification mode at the DC grid and by disabling the operation of all of the plurality of switching devices in the output stage and disabling the operation of one or more of the plurality of switching devices in the output stage to reduce a voltage mismatch at the primary winding and the secondary winding of the transformer during the DC grid fault. In addition, the control system of the converter further controls the plurality of switching devices to convert a DC voltage from the DC voltage source to one or more multi-level AC voltages at one or more selected frequencies and to control the plurality of switching devices to provide a phase difference between the one or more multilevel AC voltages at the primary winding and at the secondary winding of the transformer to yield a desired throughput power.

A method for controlling a voltage-fed modular multi-level DC-DC converter is also provided for a DC-DC converter comprising a transformer comprising a primary winding and a secondary winding, an input stage having DC terminals coupled to a DC voltage source and AC terminals coupled to the primary winding of the transformer, wherein the input stage includes at least one active primary switching arm having a plurality of cascaded cells and wherein each of the plurality of cascaded cells comprises a plurality of switching devices and at least one capacitor coupled across the DC terminals of the input stage, an output stage having DC terminals coupled to a DC grid and AC terminals coupled to the secondary winding of the transformer, wherein the output stage includes a plurality of secondary switching arms having a plurality of cascaded cells and wherein each of the plurality of cascaded cells comprises a plurality of switching devices and at least one capacitor coupled across the DC terminals of the output stage and a control system coupled to each of the plurality of switching devices of the input stage and the output stage, the control system including both hardware and software components interconnected to control the input stage and the output stage. The method includes, operating the control system to control the plurality of switching devices to realize DC fault ride-through operation under a DC grid fault by operating in a rectification mode at the DC grid and by disabling the operation of all of the plurality of switching devices in the output stage and disabling the operation of one or more of the plurality of switching devices in the output stage to reduce a voltage mismatch at the primary winding and the secondary winding of the transformer during the DC grid fault.

Accordingly, the present invention provides a modular multilevel DC-DC converter that is galvanically isolated which incorporates control methods for operating the converter to employ soft-switching and DC fault ride-though capability.

BRIEF DESCRIPTION OF THE DRAWINGS

The present invention will be better understood from the following detailed description of the invention, taken in conjunction with the accompanying drawings, in which.

DETAILED DESCRIPTION OF THE INVENTION

In various embodiments, the present invention provides a modular multilevel dual-active bridge (DAB) DC-DC converter including an internal high-frequency transformer for application to medium voltage DC (MVDC) or high voltage DC (HVDC) power grids.

Figure 1:
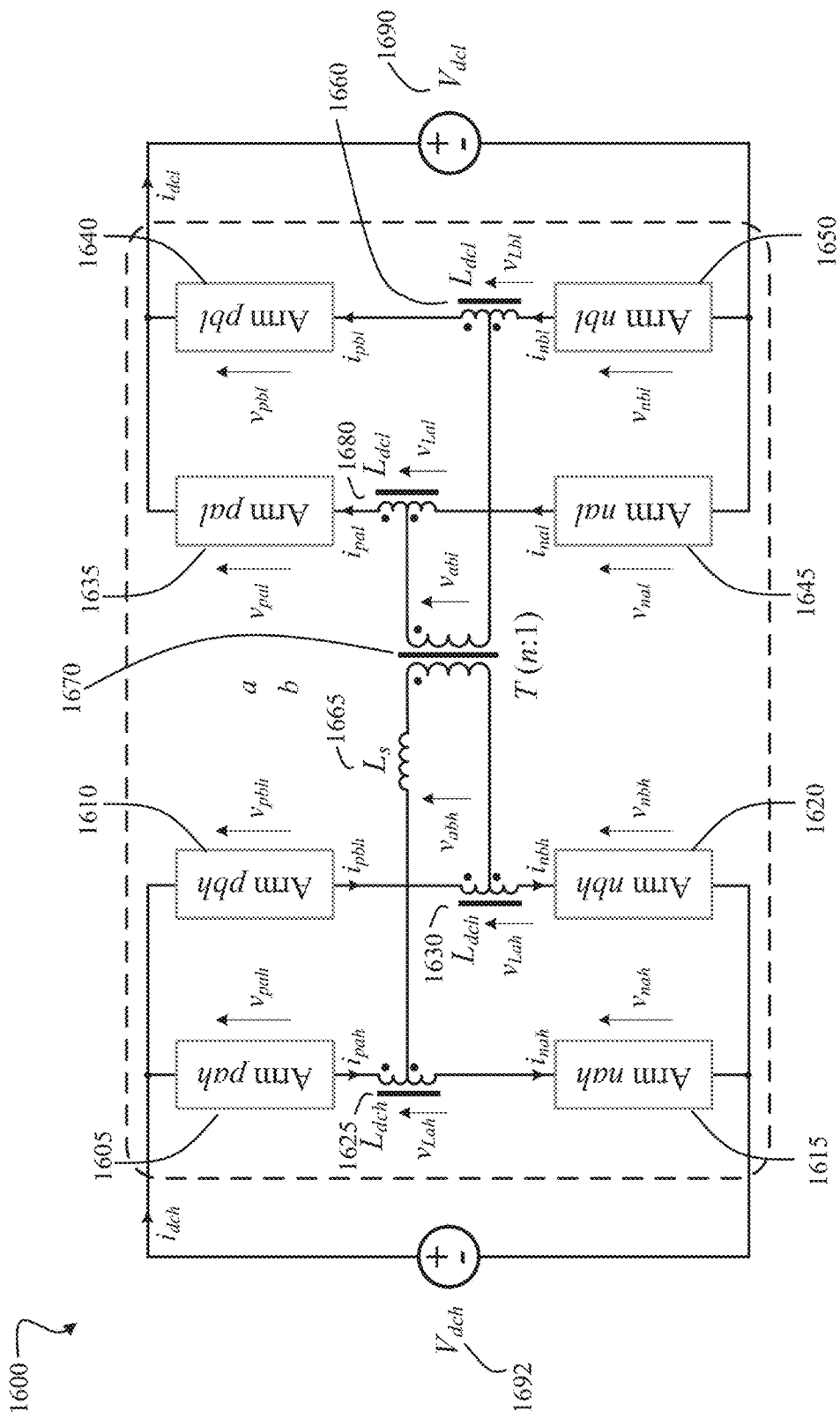
FIG. 1 illustrates a schematic circuit diagram of a single-phase CF-MDAB converter, in accordance with an embodiment of the present invention.
Figure 2:
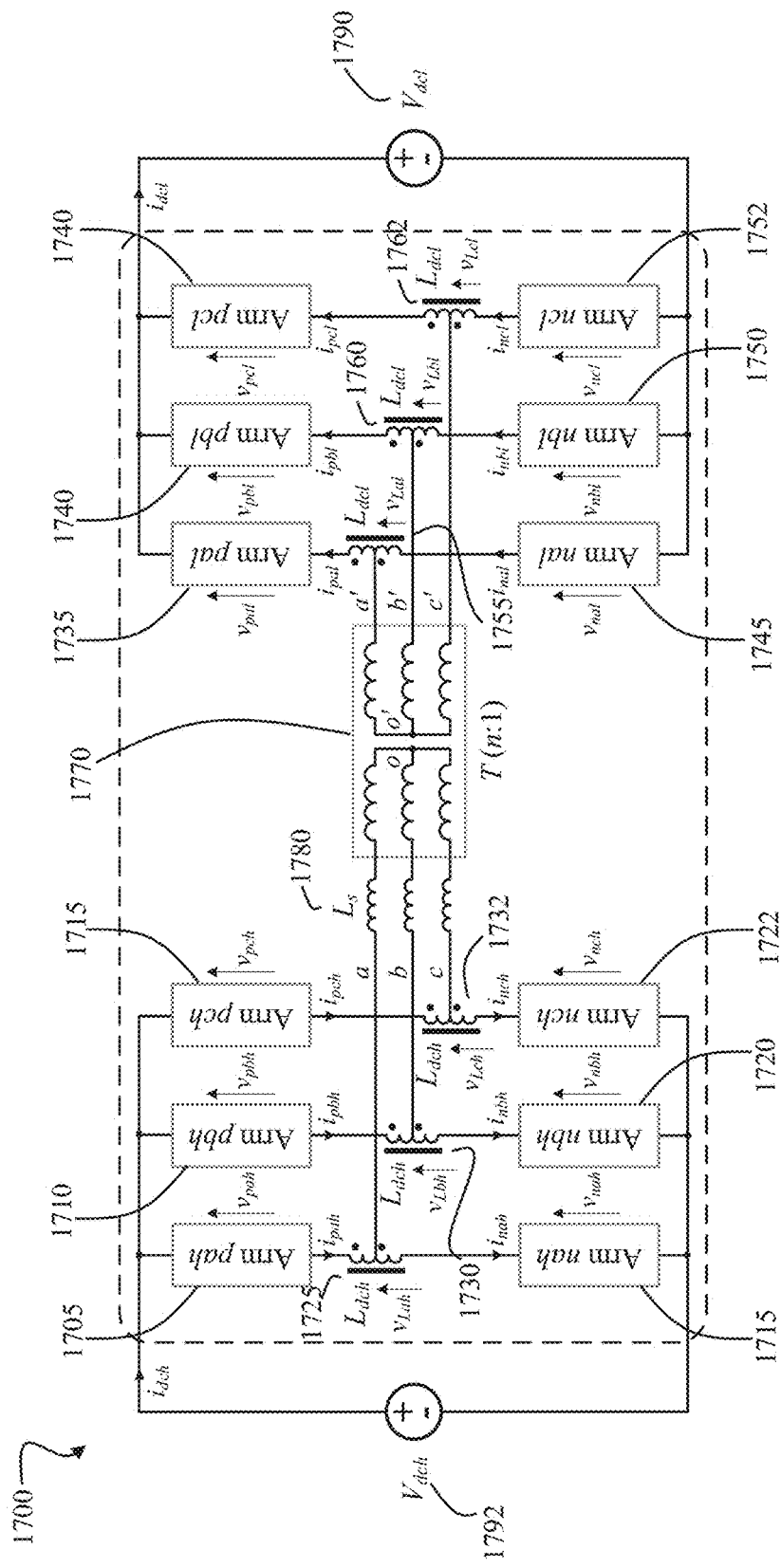
FIG. 2 illustrates a schematic circuit diagram of a poly-phase CF-MDAB converter, in accordance with an embodiment of the present invention.

In one embodiment, the DC-DC converter of the present invention may be a current-fed DC-DC converter. FIG. 1 illustrates a single-phase current fed modular dual-active bridge (CF-MDAB) DC-DC converter 1600 in accordance with an embodiment of the present invention and FIG. 2 illustrates a poly-phase current fed modular dual-active bridge (CF-MDAB) DC-DC converter 1700 in accordance with an embodiment of the present invention. The converter 1600 illustrated in FIG. 1 utilizes poly-phase units comprising an upper arm 1605, 1610, a center-tapped DC inductor 1625, 1630 (or two separate arm inductors) and a lower arm 1615, 1620 coupled in series on the primary side (or high-voltage side) of the transformer 1670 and an upper arm 1635, 1640, a center-tapped DC inductor 1655, 1660 (or two separate arm inductors) and a lower arm 1645, 1650 coupled in series on the second side (or low-voltage side) of the transformer 1670. The converter 1700 illustrated in FIG. 2 utilizes poly-phase units comprising an upper arm 1705, 1710, 1712 a center-tapped DC inductor 1725, 1730, 1732 (or two separate arm inductors) and a lower arm 1715, 1720, 1722 coupled in series on the primary side (or high-voltage side) of the transformer 1770 and an upper arm 1735, 1740, 1742, a center-tapped DC inductor 1755, 1760, 1762 (or two separate arm inductors) and a lower arm 1745, 1750, 1752 coupled in series on the second side (or low-voltage side) of the transformer 1770.

Figure 3:
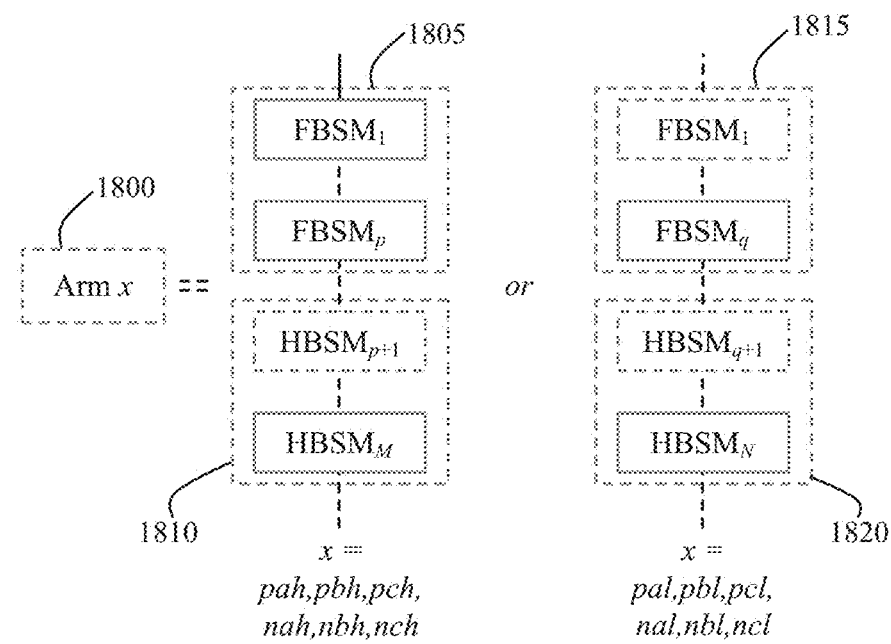
FIG. 3 illustrates the arm structure in of the embodiments illustrated in FIG. 1 and FIG. 2.
Figure 4:
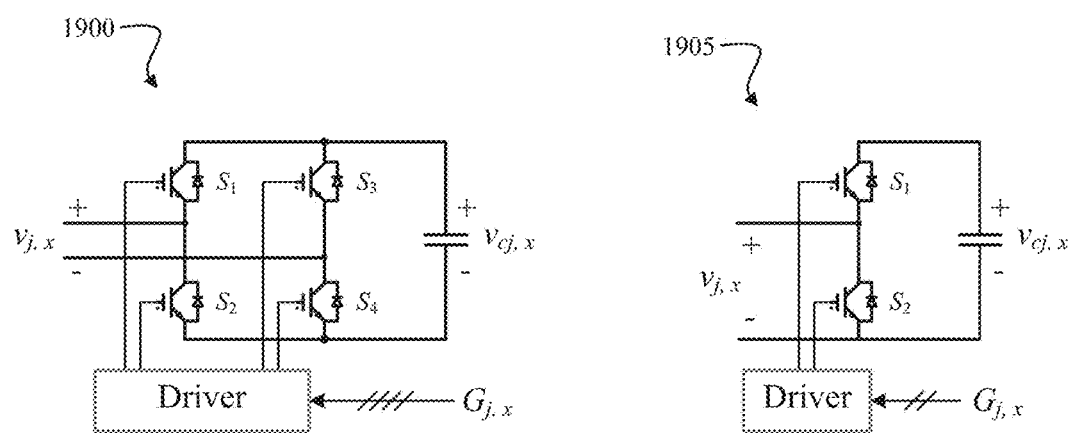
FIG. 4 illustrates the submodules comprising an arm, in accordance with an embodiment of the present invention.

As shown in FIG. 3, each primary arm 1800 of the converters 1600, 1700 shown in FIG. 1 and FIG. 2, respectively, further comprises p FBSMs 1805 and M-p HBSMs 1810 coupled in series ($1 \leq p \leq M$) and each secondary arm 1800 further comprises q FBSMs 1815 and N-q half-bridge cells 1820 in series ($1 \leq q \leq N$). FIG. 4 illustrates the switching configuration and additional components in a typical FBSM 1900 and in a typical HBSM 1905.

For the converter 1600 illustrated is FIG. 1, for the primary side, the DC terminal 1692 is formed between the common positive terminal of the upper arms 1605, 1610 and the common negative terminal of the lower arms 1615, 1620, and the AC terminal is formed at center taps of the primary side DC inductors 1625, 1630 connecting to the high-frequency transformer T 1670 with turns ratio of n. For the primary side, the DC terminal 1690 is formed between the common positive terminal of the upper arms 1635, 1640 and the common negative terminal of the lower arms 1645, 1650, and the AC terminal is formed at center taps of the secondary side DC inductors 1655, 1660. Here $L_s$ 1680 represents the overall AC inductance including the leakage inductance, stray inductance and optional external AC inductance. Center-taped DC inductors are used illustratively to realize different AC and DC inductances.

For the converter 1700 illustrated is FIG. 2, for the primary side, the DC terminal 1792 is formed between the common positive terminal of the upper arms 1705, 1710, 1712 and the common negative terminal of the lower arms 1715, 1720, 1722, and the AC terminal is formed at center taps of the primary side DC inductors 1725, 1730, 1732 connecting to the high-frequency transformer T 1770 with turns ratio of n. For the primary side, the DC terminal 1790 is formed between the common positive terminal of the upper arms 1735, 1740, 1742 and the common negative terminal of the lower arms 1745, 1750, 1752, and the AC terminal is formed at center taps of the secondary side DC inductors 1755, 1760, 1762. Here $L_s$ 1780 represents the overall AC inductance including the leakage inductance, stray inductance and optional external AC inductance. Center-taped DC inductors are used illustratively to realize different AC and DC inductances.

In normal operation of the converters 1600, 1700, the FBSMs are operated in half-bridge mode by bypassing one leg in the FBSMs, and are only operated in full-bridge mode under DC fault operation mode. The switching device in the submodules is illustrative and is not limited to be an IGBT with anti-parallel diode, other switching elements, such as MOSFET devices, are considered within the scope of the present invention.

Figure 5A:
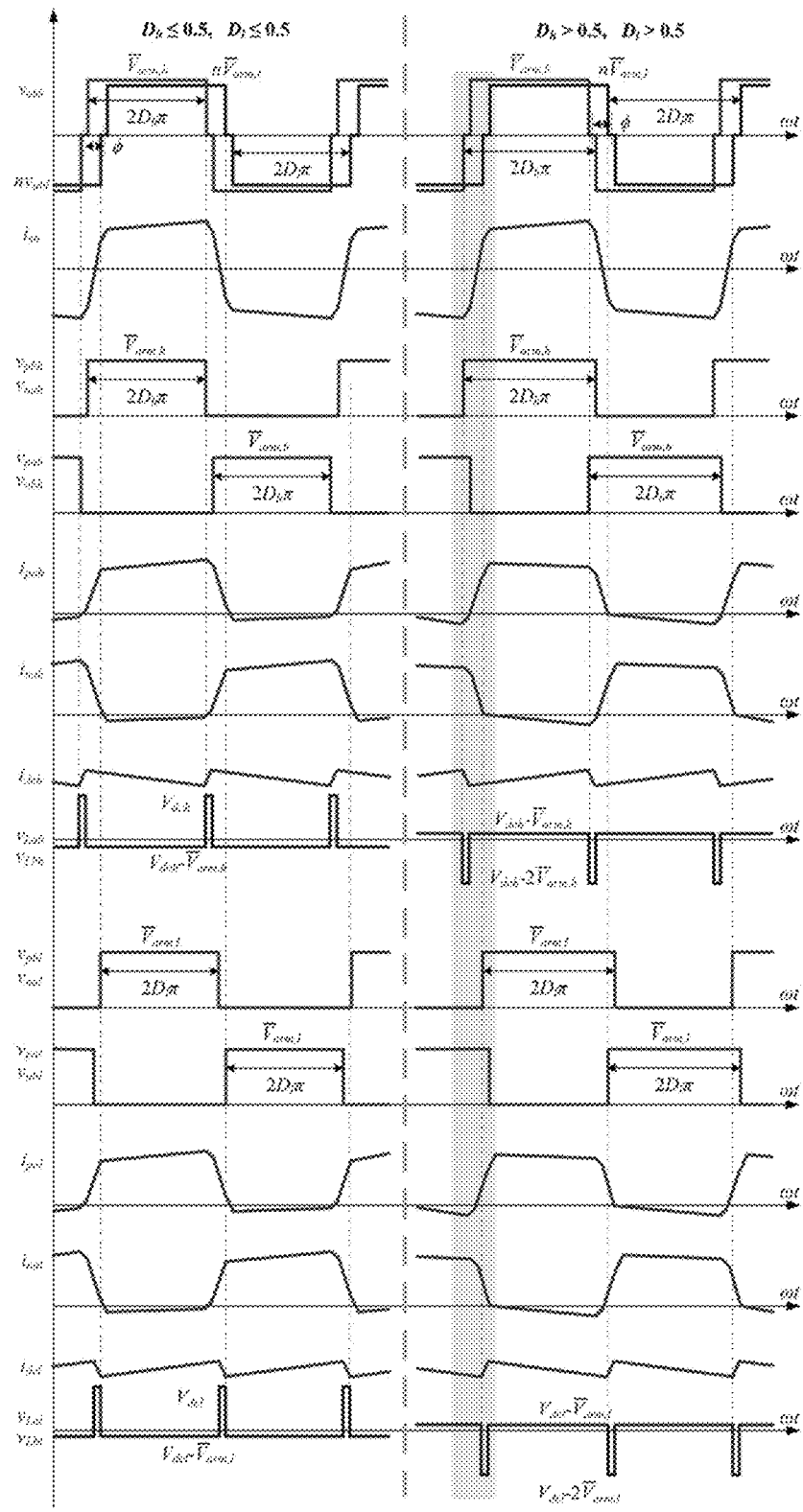
FIG. 5A is a graphical illustration of the voltage and current waveforms associated with FIG. 1 under normal operation mode, in accordance with an embodiment of the present invention.
Figure 5B:
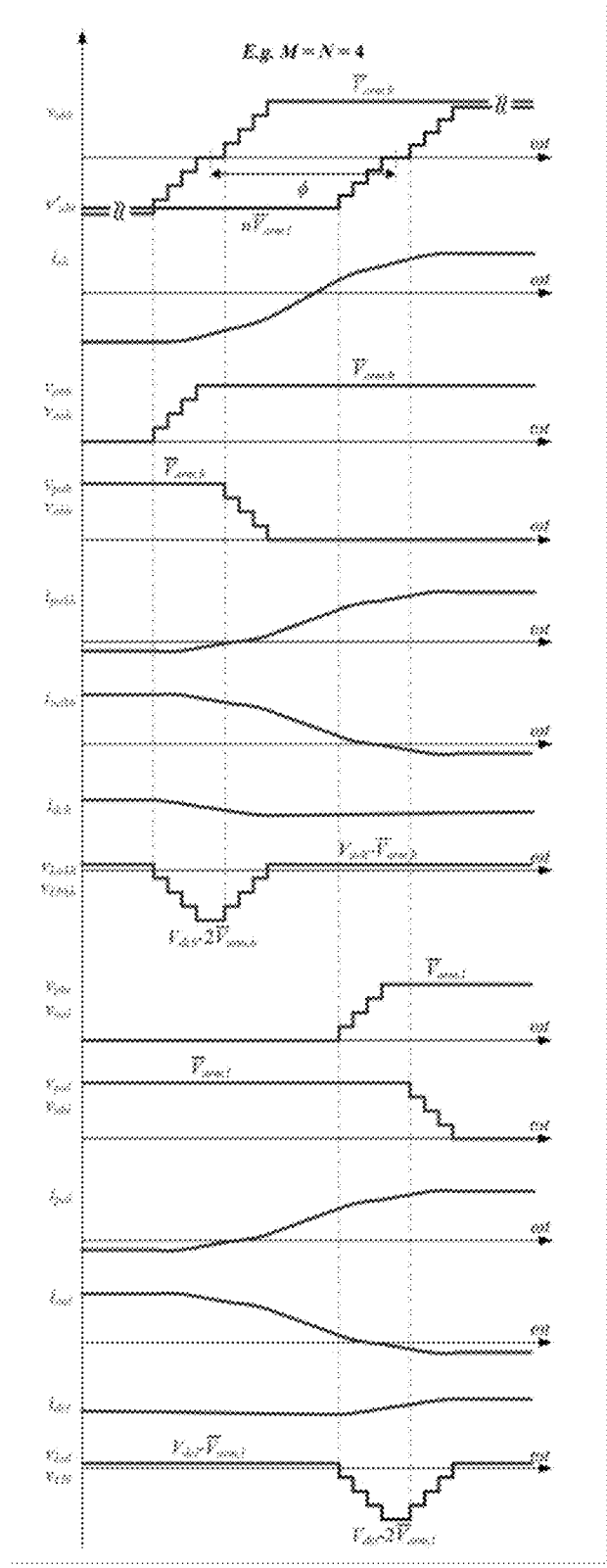
FIG. 5B illustrates an exploded view of the shaded under area in FIG. 5A.

The conventional modulation strategy for CF-DAB converters cannot be directly applied to the modular, CF-MDAB converter of the present invention. As such, FIG. 5A illustrates the typical voltage and current waveforms resulting from the revised modulation method for the CF-MDAB converters of the present invention, when the converter in accordance with the present invention is operating under a normal operation mode. To operate the converter in DAB mode, Q2L (quasi two-level) modulation is applied for each arm (LVS and HVS) and the cells in each arm are slightly phase shifted to generate staircase multilevel output voltages with reduced the dv/dt, as shown in FIG. 5B. With an acceptable dv/dt, small dwell angle α and β are preferred since they reduce the DC voltage utilization. By assuming α and β are much smaller than the phase shift angle φ, the arms are considered as two-level switches hereafter in the description for simplification.

HVS arms of the converter, illustrated in FIG. 1, are taken as an example for illustration of the modulation method of the present invention. In the modulation method of the present invention, two HVS phases are 180° phase-shifted and the upper and lower arms inside a phase are also 180° phase-shifted, instead of employing complementary operation. In addition, the same duty cycle $D_h$ is applied for all the HVS arms. As a result, when $D_h < 0.5$, a shoot-through state exists in which the upper and lower arms both have zero output voltage, i.e. $v_{pah} = v_{nah} = v_{pbh} = v_{nbh} = 0$. Also, when $D_h > 0.5$ an overlap state exists in which the upper and lower arms both have positive output voltage, i.e. $v_{pah} = v_{nah} = v_{pbh} = v_{nbh} = \overline{V}_{arm, h}$, where $\overline{V}_{arm, h}$ is the average arm voltage. In the DC loop, during the non-overlap or non-shoot-through state, the sum of upper and lower arm output voltage, i.e. the phase voltage, equals to $\overline{V}_{arm, h}$, while during the overlap-state and shoot-through state, a phase voltage of $2\overline{V}_{arm, h}$ and 0 will be generated respectively. Therefore, pulsed voltages will be applied on the DC inductors, thereby regulating the DC current. Utilizing this modulation method, a boost-type converter is integrated and the DC current is fully controllable. Similar to a CF-DAB converter, the DC current ripple frequency is twice that of the switching frequency and ripple magnitude is equal to zero when $D_h = 0.5$. The relationship between the DC bus voltage $V_{dch}$ and average arm voltage $\vec{V}_{arm, h}$ is given as:

$$\overline{V}_{arm,h} = \frac{V_{dch}}{2D_h} \quad (3)$$

By regulating the $\overline{V}_{arm,h}$ to $V_{dch}$, $D_h$ will be 0.5, which is preferred for high efficient operation of the CF-MDAB converter of the present invention. The corresponding nominal voltage of the HVS cell capacitors is $\overline{V}_{arm,h}/M$. The same modulation method may be applied to the LVS arms, and the relationship between the DC bus voltage $V_{dcl}$, average arm voltage $\overline{V}_{arm,l}$ and the duty $D_l$ is given as:

$$V_{dcl} = 2\overline{V}_{arm,l} \quad (4)$$

From the AC side waveforms, the typical throughout power of the converter in accordance with the present invention can be calculated by:

$$P = \frac{n\overline{V}_{arm,h}\overline{V}_{arm,l}}{\omega L_s}\phi\left[\left(1 - \frac{|\phi|}{\pi}\right) - \frac{\pi}{4|\phi|}(1-2D_h^T)^2 - \frac{\pi}{4|\phi|}(1-2D_l^T)^2\right] \quad (5)$$

where ω is the angular switching frequency, φ is the phase shift angle between the secondary and primary AC voltages, $D_h^T=\min\{D_h,1-D_h\}$ and $D_l^T=\min\{D_l,1-D_l\}$.

Similar to a multilevel modular converter (MMC), each phase equally shares DC output current and the AC current is spread equally in the upper and lower arms. The current stress of axillary switches and cell capacitors is much smaller than that of the main switches due to the cancellation of DC and AC currents, thereby low current rating devices can be implemented in the cells. This also enables the use of small cell capacitors as the main power flow is directly transferred between AC and DC sides without being buffered in the capacitors.

Figure 6A:
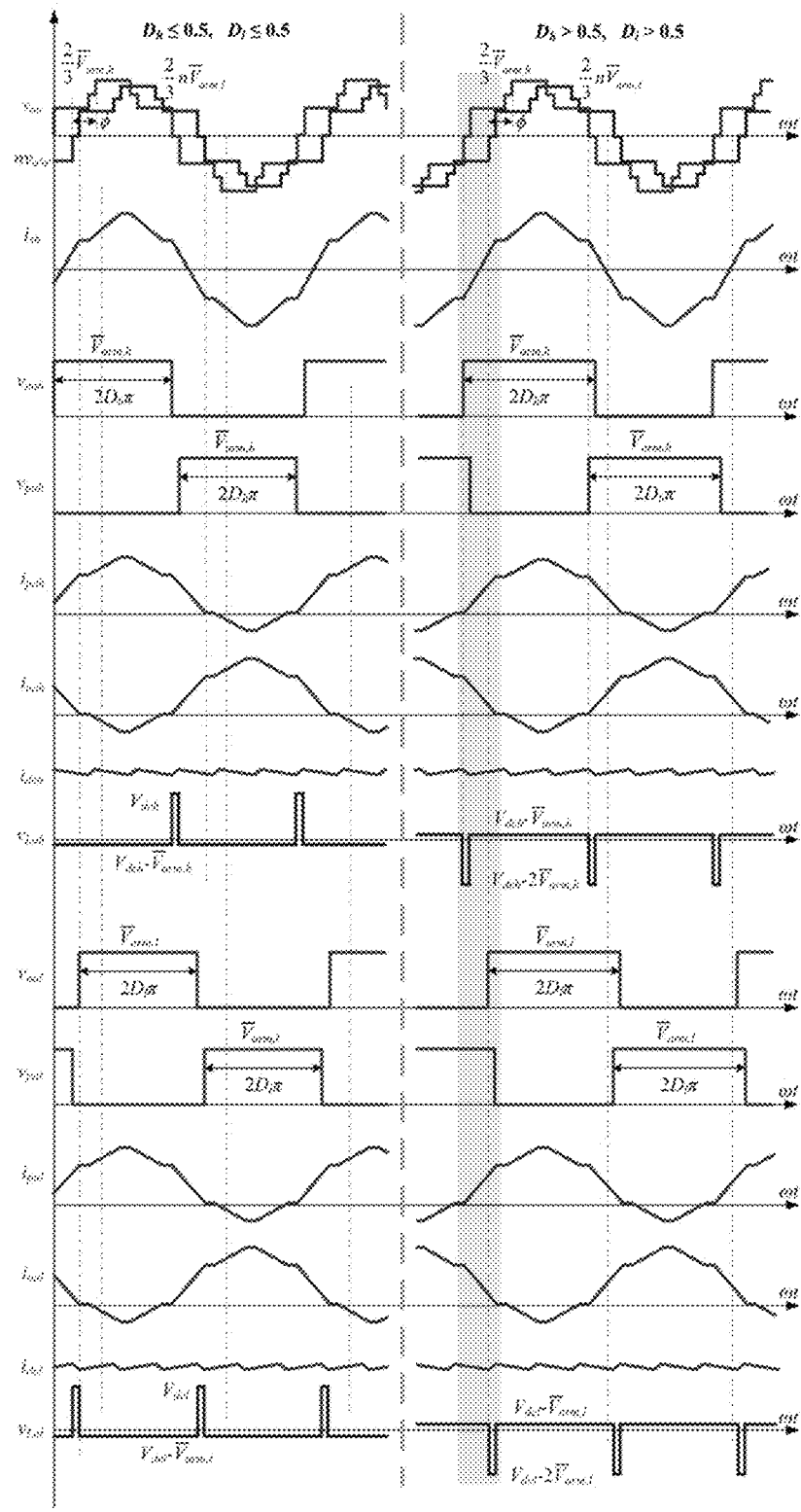
FIG. 6A is a graphical illustration of the voltage and current waveforms associated with FIG. 2 under normal operation mode, in accordance with an embodiment of the present invention.
Figure 6B:
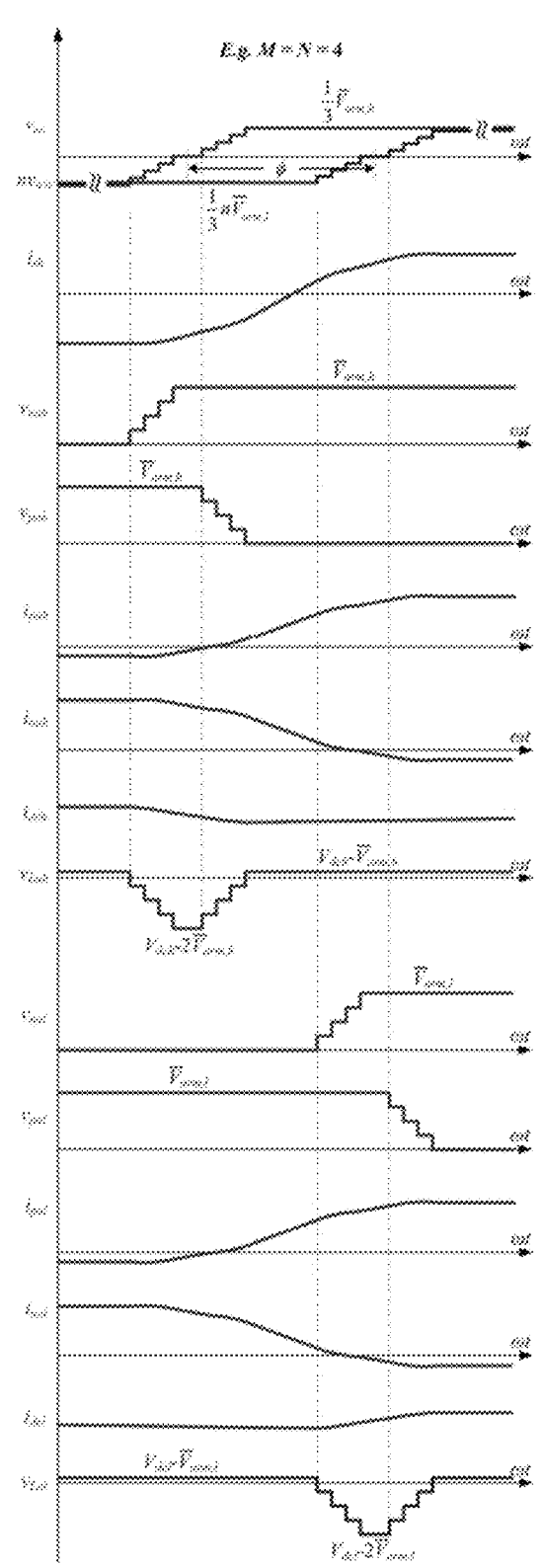
FIG. 6B illustrates an exploded view of the shaded area in FIG. 6A.

FIG. 6A illustrates the typical voltage and current waveforms of the present invention for FIG. 2, with the zoom view of the shaded area shown in FIG. 6B. In this embodiment, the same modulation method described above for the converter of FIG. 1 is applied, except for a 120° phase-shifting in phases for the implementation of the three-phase topology. Thereby the above equations also apply. In this embodiment, the DC current ripple frequency is six times that of the switching frequency.

Figure 7:
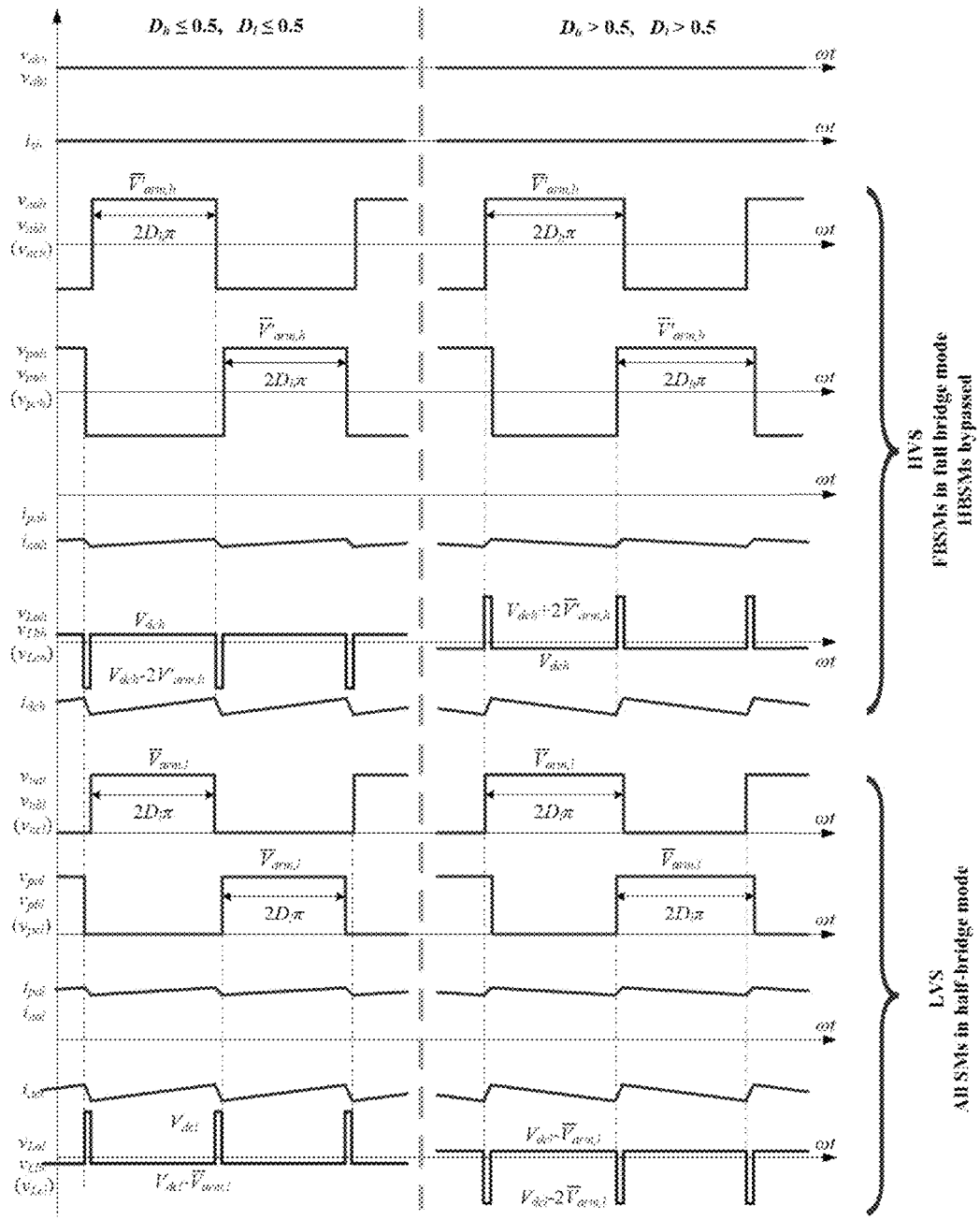
FIG. 7 is a graphical illustration of the voltage and current waveforms associated with FIG. 1 and FIG. 2 under DC fault operation mode, with $V_{dch}$ fault as example, in accordance with an embodiment of the present invention.
Figure 8:
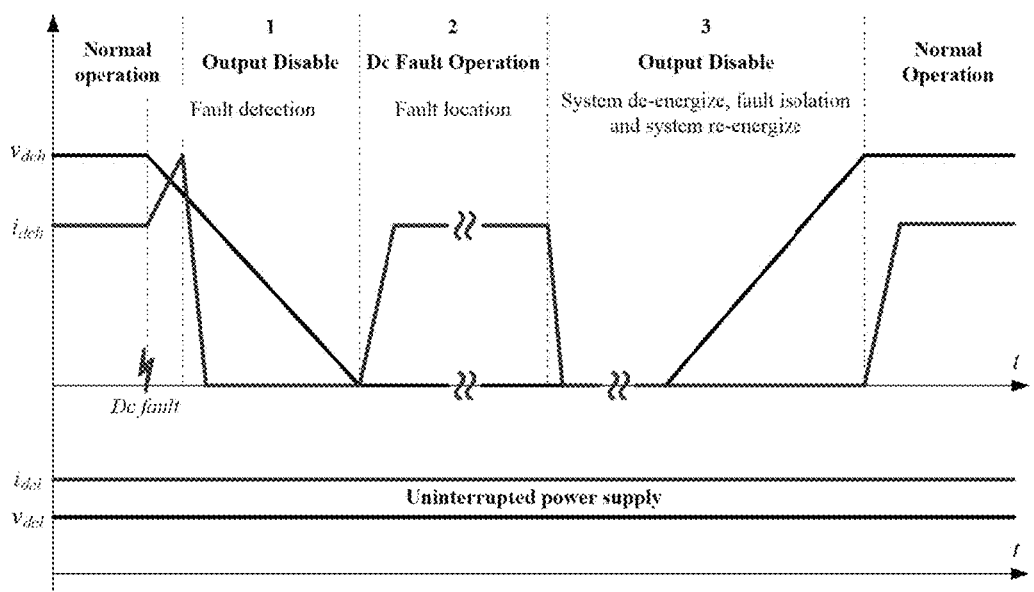
FIG. 8 is a graphical illustration of a typical DC fault ride-through process, in accordance with an embodiment of the present invention associated with FIG. 1 and FIG. 2, with $V_{dch}$ fault as example.

FIG. 7 illustrates the typical voltage and current waveforms of the embodiment of the present invention illustrated in FIG. 1 and FIG. 2, under DC fault operation mode, such as an HVS DC fault, for example, i.e. $v_{dch}=0$: The operation principle is similar to that in normal operation mode, using shoot-through and overlap states in upper and lower arms voltage for DC current regulation. The difference is that all the HVS HBSMs are bypassed to cooperate with zero DC-link voltage and HVS FBSMs are operated in full-bridge mode with positive/negative 2-level output. With the upper arms and lower arms 180° phase shifted, a pulsed voltage can be generated on the DC inductor and the DC fault current can thereby be controlled through duty cycle regulation. The HVS arm voltage is $\overline{V}_{arm,h}=p\overline{V}_{ch}$, where $\overline{V}_{ch}$ is the HVS average cell capacitor voltage. During the fault, the LYS arms can provide an uninterrupted power supply during the DC fault by discharging the cell capacitors, with same operation manner in normal operation mode, as shown in FIG. 8. To limit the AC current, the phases in HVS or LVS are placed in the same phase and the phase shift angle between the HVS and LVS arms are set to zero, i.e. φ=0. If uninterrupted power supply is not desired, the LVS arms can simply be blocked by disabling the gating signals.

FIG. 8 illustrates a typical DC fault ride-through process for the embodiments of the present invention illustrated in FIG. 1 and FIG. 2, with an HVS DC fault as an example for illustration, i.e. $v_{dch}=0$. The process consists of the DC fault operation stage and two disabling stages. When a HVS DC fault occurs, the DC fault current rises quickly due to DC voltage drop. Once the DC current exceeds a threshold, DC fault is detected, thereby triggering the DC fault ride-though operation to be initiated by the controller. In the first stage, the HVS side of the converter is disabled by blocking the gating signals and the DC fault current decreases quickly to zero. The reason for disabling the converter during DC voltage drop is mainly to avoid excessive ripple current due to small DC inductors. After the DC voltage is below a certain threshold, the converter starts the DC fault operation mode by providing continuous DC fault current to assist in fault segment locating. After the fault is located, the converter disables the HVS side of the converter to de-energize the system for fault segment isolation. Once the DC bus has been restored, the converter switches back to normal operation mode. During the process, the LVS side of the converter provides an uninterrupted power supply by discharging the cell capacitors.

Figure 9:
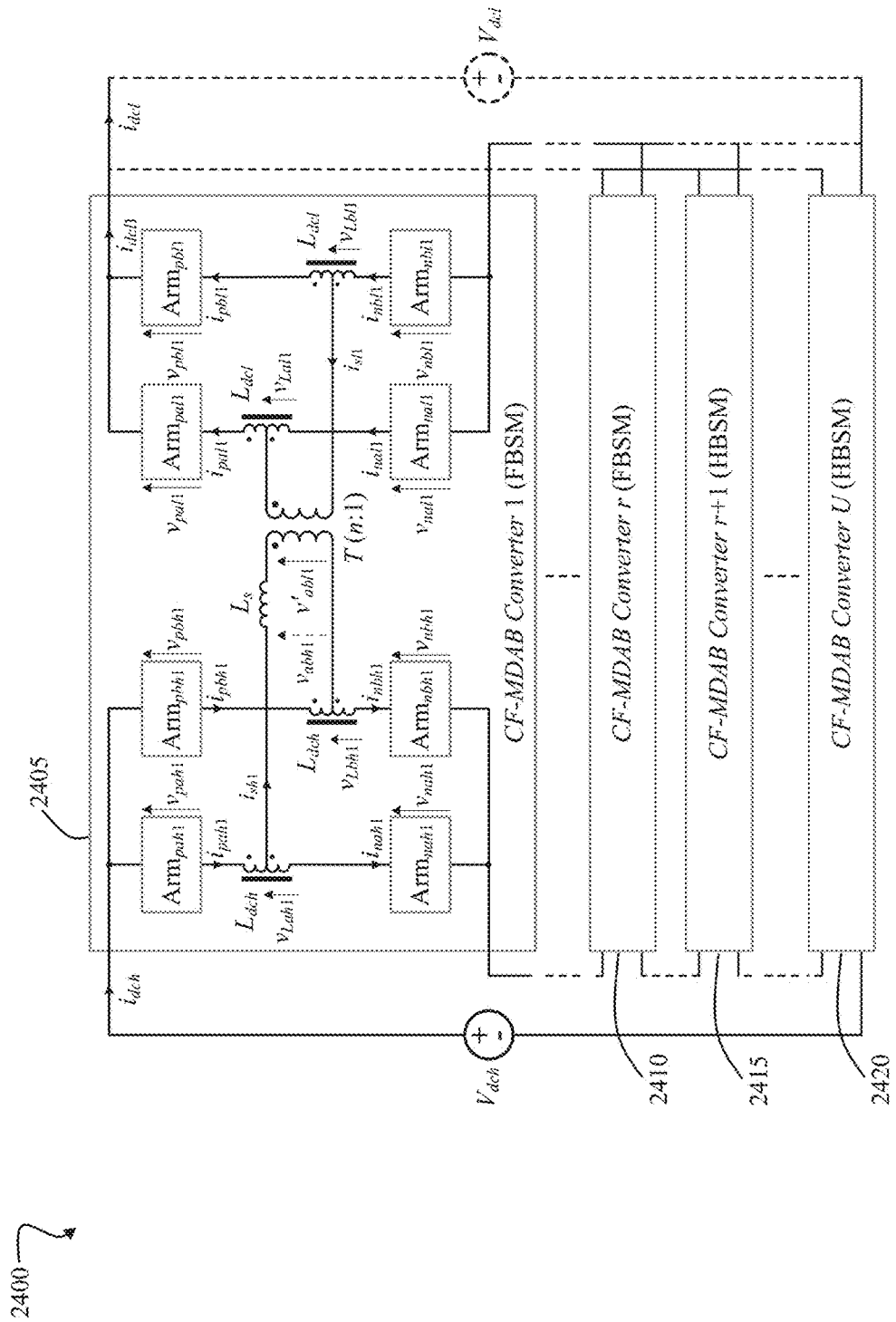
FIG. 9 is a schematic circuit diagram illustrating of ISOP CF-MDAB converter, in accordance with an embodiment of the present invention.

FIG. 9 is a schematic circuit diagram of an input-series output-parallel (ISOP) CF-MDAB converter in accordance with an embodiment of the present invention, where the single-phase CF-MDAB converter 2400 is implemented using sub-converters 2405, 2410, 2415, 2420. With the ISOP configuration, the submodule (or cell) number M or N in an arm of a sub-converter 2405, 2410, 2415, 2420 can be reduced. To achieve fault ride-though operation, FBSMs can be implemented in r sub-converters, while HBSMs can be implemented for the other U-r sub-converters (1≤r≤U). Similar to in FIG. 1 and FIG. 2, the FBSMs are only for DC fault ride-through purposes, and are operated as HBSMs during normal operation. The embodiment of the invention in FIG. 1 and FIG. 2, can be seen as a special case of FIG. 9, in which the sub-converter number U=1.

Figure 10:
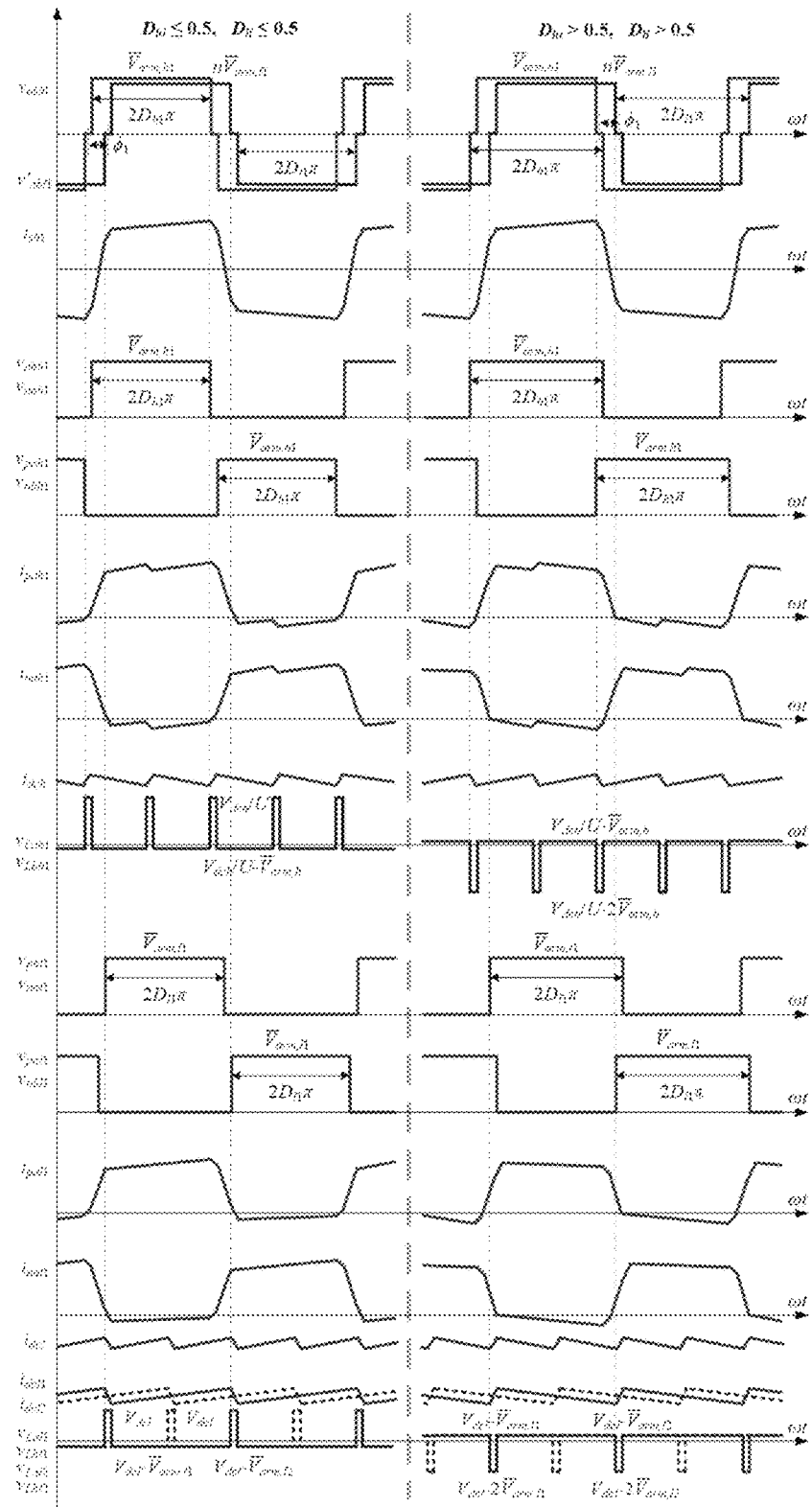
FIG. 10 illustrates the voltage and current waveforms associated with FIG. 9 under normal operation mode.

FIG. 10 illustrates the typical voltage and current waveforms of the embodiment of the present invention illustrated in FIG. 9, with U=2, r=1, M=N=1, as example. To achieve low current ripples, the U sub-converters are interleaved by phase angle π/U. The relation between the DC voltage and arm voltage is given as:

$$\begin{cases} V_{dch} = \sum_{i=1}^{U} D_{hi}\overline{V}_{arm,hi} = 2UD_h\overline{V}_{arm,h} \\ V_{dcl} = 2D_{li}\overline{V}_{arm,li} \end{cases} \quad (6)$$

where $\overline{V}_{arm,hi}$ and $\overline{V}_{arm,li}$ are the HVS and LVS average arm voltage of sub-converter i respectively, $D_{hi}$ and $D_{li}$ are the HVS and LVS duty cycle of sub-converter i respectively, $D_h$ and $\overline{V}_{arm,h}$ are the HVS average duty cycle and arm voltage, respectively. The DC fault ride-through process illustrated FIG. 8 is also applicable for the ESOP CF-MDAB converter illustrated in FIG. 9.

Figure 11A:
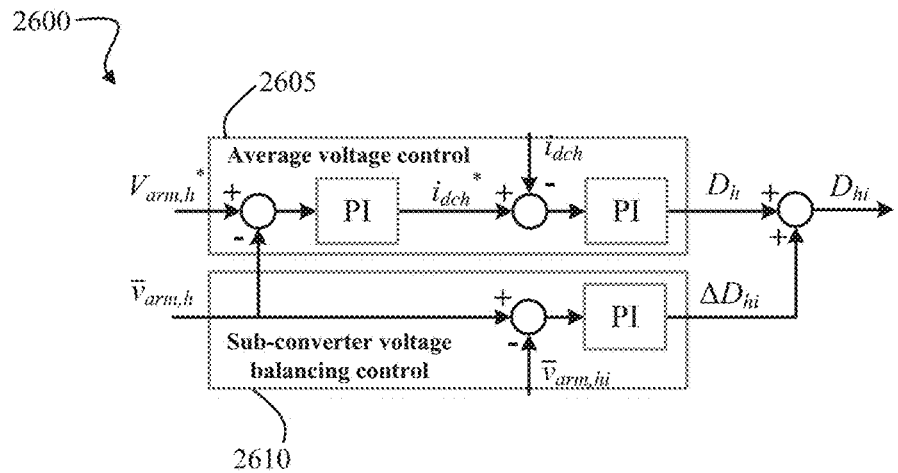
FIG. 11A illustrates a system control for CF-MDAB under normal operation mode implementing the high voltage side (HVS) average arm voltage control, in accordance with an embodiment of the present invention.
Figure 11B:
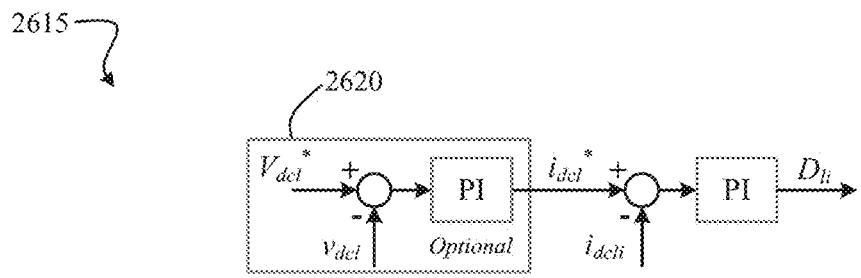
FIG. 11B illustrates a system control for CF-MDAB under normal operation mode implementing the low voltage side (LVS) output voltage or current control, in accordance with an embodiment of the present invention.
Figure 11C:
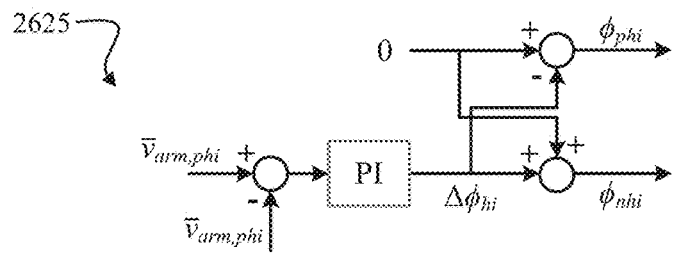
FIG. 11C illustrates a system control for CF-MDAB under normal operation mode implementing HVS arm voltage balance control, in accordance with an embodiment of the present invention.
Figure 11D:
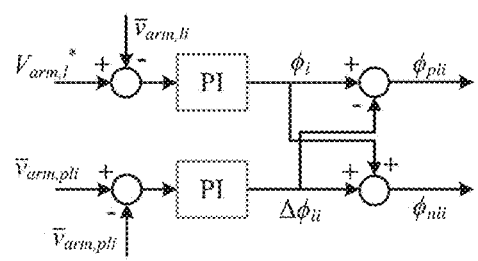
FIG. 11D illustrates a system control for CF-MDAB under normal operation mode implementing LVS average arm voltage control and arm voltage balancing control, in accordance with an embodiment of the present invention.

FIG. 11A FIG. 11D illustrates an exemplary system control for the CF-MDAB converter of the present invention under normal operation mode, taking the embodiment illustrated in invention in FIG. 9 as a general example.

FIG. 11A illustrates an HVS arm voltage control system 2600, including the arm average voltage control 2605 and the sub-converter voltage balancing control 2610. The HVS arm average voltage is controlled through the average duty cycle $D_h$ using dual loop with DC current loop as the inner control loop. To balance the arm average voltage of the sub-converters, additional duty cycle $\Delta D_{hi}$ which regulates arm average voltage of each sub-converter to the overall arm average voltage $\bar{V}_{arm,h}$, is added to $D_h$ to generate $D_{hi}$ for each sub-converter. To achieve low DC current ripple, the arm average voltage reference $\bar{V}_{arm,h}$ can be set to $V_{dch}$.

The LVS DC voltage or DC current is regulated through duty cycle $D_{li}$ of each sub-converters, as illustrated by the control system 2615 of FIG. 11B. Dual loop control is adopted, where the optional bus voltage outer loop 2620 generates a common DC current reference for the inner current loop that regulates the DC current $i_{dcli}$ of each sub-converter, respectively. Through this control method, the power of each sub-converter is balanced.

The upper arms or the lower arms of CF-MDAB converter mode are automatically balanced under the present modulation method, DC circulating current will be generated in the AC loop under voltage imbalance through the inherent proportional integral (PI) controller, which balances the upper arms or lower arms. However, the upper and lower arm voltages do require balancing control. FIG. 11C illustrates a control system 2625 for implementing the HVS upper and lower average arm voltage balancing control in each sub-converter. A phase shift angle difference $\Delta \varphi_{hi}$ regulating the difference between average upper arm voltage $\bar{V}_{arm,phi}$ and average lower arm voltage $\bar{V}_{arm,nhi}$ in sub-converter i, is introduced for the upper and lower arms of sub-converter i, which excites AC circulating current and redistributes the AC power in the upper arms and the lower arms, thereby balances the arm voltages.

FIG. 11D illustrates a control system 2630 to implement the LVS arm average voltage and balancing control for each sub-converter. The LVS arm average voltage of each sub-converter is controlled independently through the phase shift angle Like in HVS, phase shift angle difference $\Delta \varphi_{li}$ is used to balance the upper and lower arms' voltages in each sub-converter i. For low DC current ripple, the arm average voltage reference $\bar{V}_{arm,l}^*$ can be set to $V_{dcl}$.

Figure 12A:
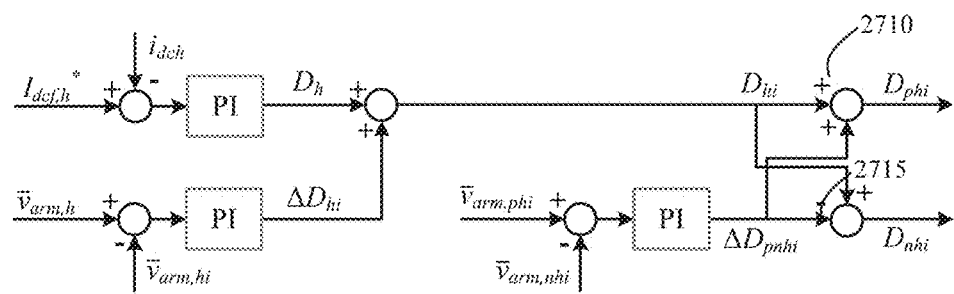
FIG. 12A illustrates a system control for CF-MDAB under dc-fault operation mode (e.g. $V_{dch}$ fault) implementing HVS DC fault current, average arm voltage and arm voltage balancing control, in accordance with an embodiment of the present invention.
Figure 12B:
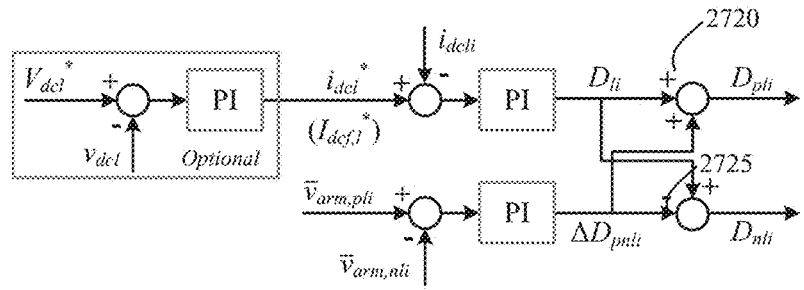
FIG. 12B illustrates a system for CF-MDAB under dc-fault operation mode (e.g. $V_{dch}$ fault) implementing LVS output voltage or current control and arm voltage balancing control, in accordance with an embodiment of the present invention.

FIG. 12A and FIG. 12B illustrate an exemplary control system of the CF-MDAB converter in accordance with the present invention, under HVS DC fault operation mode, taking the embodiment in FIG. 9 as a general example. Since phase shift angle control is not applicable under DC fault operation mode, duty cycle is used for all the control. FIG. 12B is also applicable for LVS DC fault operation mode, in which the DC voltage loop is bypassed.

FIG. 12A illustrates an HVS control system 2700 with duty cycle, including DC fault current control, the sub-converter voltage balancing control, and the arm voltage balancing control. The HVS DC fault current is regulated by the average duty cycle $D_h$ through a compensator. Like in normal operation mode, to balance the arm average voltage of sub-converters, additional duty cycle $\Delta D_{hi}$ which regulates arm average voltage $\bar{V}_{arm,hi}$ of each sub-converter to the overall arm average voltage $\bar{V}_{arm,h}$ is added to $D_h$ to generate $D_{hi}$ for each sub-converter. In addition, to realize the upper and lower arms voltage balancing in a sub-converter, the duty cycle difference $\Delta D_{pnhi}$, which regulates the difference of the upper arms average voltage $\bar{V}_{arm,phi}$ and lower arms average voltage $\bar{V}_{arm,nhi}$, is added to $D_{hi}$, generating different duty cycles $D_{phi}$ 2710 and $D_{nhi}$ 2715, thus different power for upper and lower arms.

FIG. 12B illustrates an LVS control system 2705 with duty cycle, including DC voltage or DC current control and the arm voltage balancing control. The DC voltage control is the same as that in normal operation mode through dual loop regulation, where the optional bus voltage outer loop generates a common DC current reference $i_{dcl}^*$ for the inner current control loops that regulate the DC current $i_{dcli}$ of each sub-converter respectively. As in HVS, to realize the upper and lower arms voltage balancing in a sub-converter, the duty cycle difference $\Delta D_{pnli}$, which regulates the difference of the upper arms average voltage $\bar{V}_{arm,pli}$ and lower arms average voltage $\bar{V}_{arm,nli}$, is added to $D_{li}$, generating different duty cycles $D_{pli}$ 2720 and $D_{nli}$ 2725, thus different power for upper and lower arms.

Figure 13:
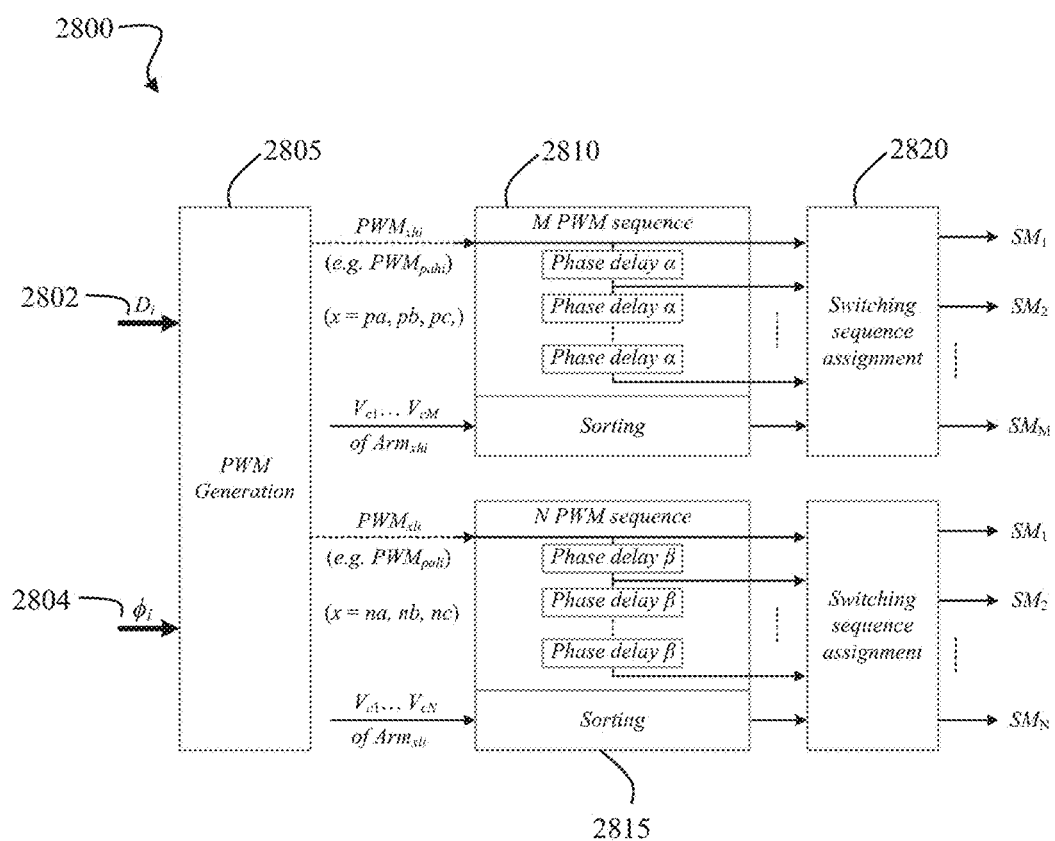
FIG. 13 illustrates quasi-two-level (Q2L) PWM generation with cell voltage balancing using sorting method, in accordance with an embodiment of the present invention.

FIG. 13 illustrates a quasi-two-level PWM generation with cell voltage balancing utilizing a sorting method 2800, in accordance with an embodiment of the present invention. With the duty cycles 2802 and phase shift angles 2804 from the control system, the PMM generation block 2805 will generate arm-level PWM signals, which are sent to PWM sequence generation block 2810. By applying multiple phase delay units, a PWM sequence will be generated and paired with submodules, resulting in a staircase Q2L arm output voltage. To balance the cell voltage, the cell capacitor voltage in the arms are sorted in ascending or descending order by a sorting block 2815, and paired to the Q2L PWM sequence to generate the switching sequence assignment 2820. The slight phase delay in the PWM sequence will result in different cell power, thus balancing the cell voltage.

Figure 14A:
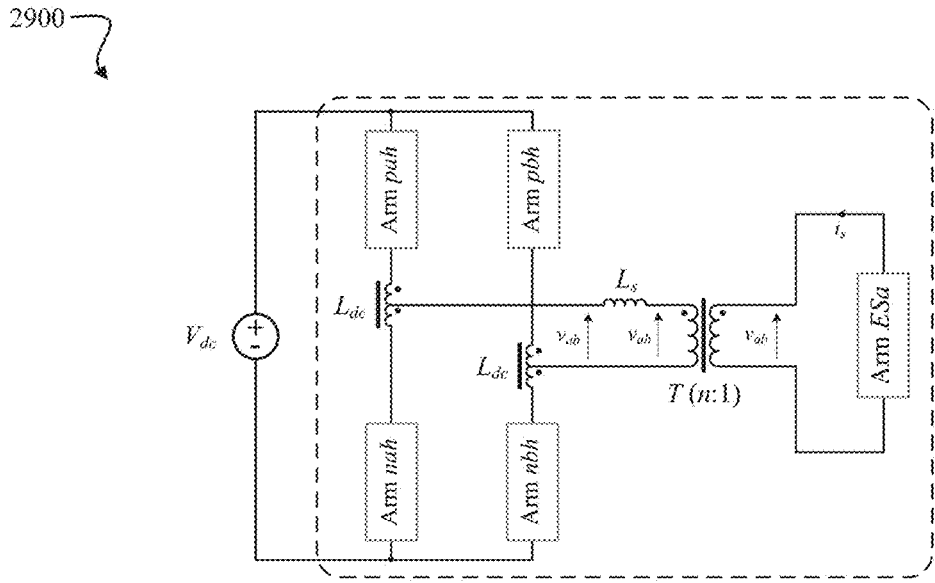
FIG. 14A illustrates a BESS based on a single-phase CF-MDAB converter, in accordance with an embodiment of the present invention.
Figure 14B:
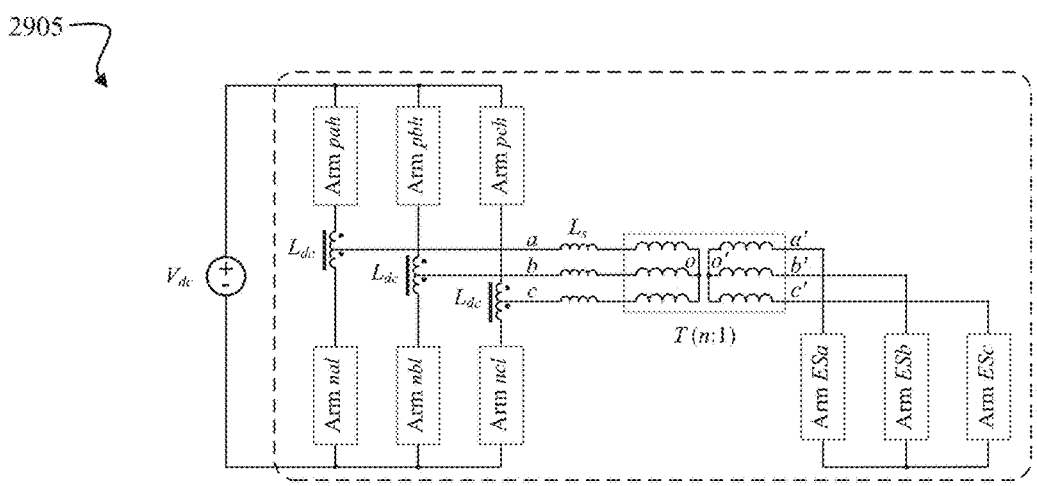
FIG. 14B illustrates a BESS based on three-phase CF-MDAB converter, in accordance with an embodiment of the present invention.
Figure 14C:
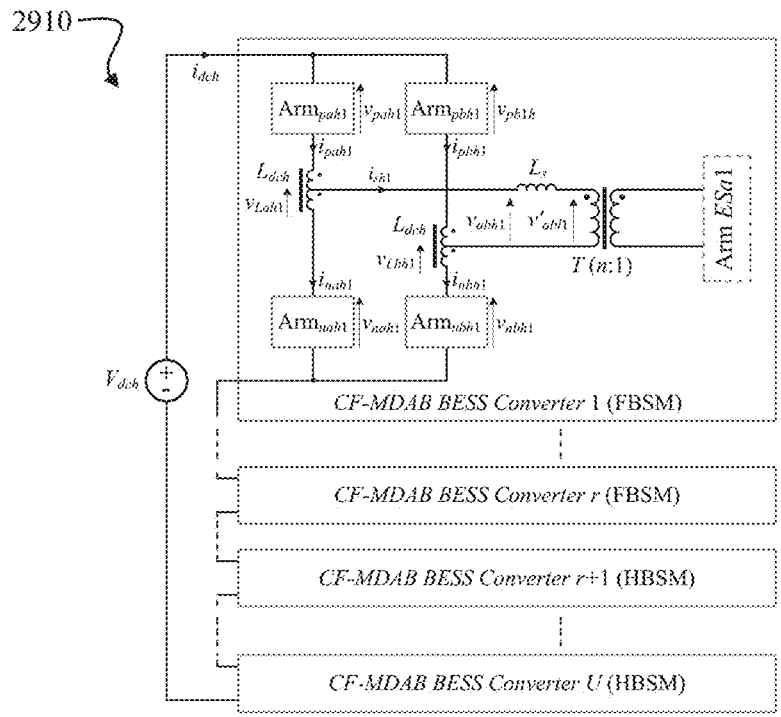
FIG. 14C illustrates a BESS based on ISOI CF-MDAB converter, in accordance with an embodiment of the present invention.
Figure 14D:
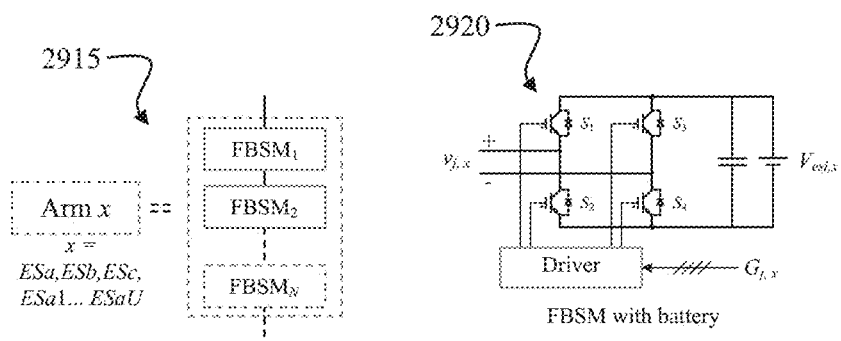
FIG. 14D illustrates the battery side arm and submodule in FIG. 15A, FIG. 15B and FIG. 14C, in accordance with an embodiment of the present invention.

Similar to a conventional DAB converter, the CF-MDAB converter of the present invention can be utilized with a battery energy storage system (BESS). In this embodiment, since only one DC terminal is needed for BESS integration, the CF-MDAB converters are simplified by using only the lower arms for the battery side. FIG. 14A illustrates a converter to be used with BESS which is based on a single-phase CF-MDAB converter 2900. The converter 2905 illustrated in FIG. 14B illustrates a BESS implementation a based on three-phase CF-MDAB converter, and the converter 2910 in FIG. 14C illustrates a BESS implementation based on an ISOI CF-MDAB converter, where the FBSMs 2915 are adapted for battery unit integration 2920 for low battery current ripple as shown in FIG. 14D. The operation principle is the same as that of the CF-MDAB converter previously described and the battery side control is simplified and only requires mainly state-of-charge balancing control.

As previously described, the CF-MDAB DC-DC converter may be integrated with a battery energy storage system (BESS) and the converter of the present invention may operate to transfer DC power or energy between the batteries of the BESS and the DC grid, utilizing active primary switching arms which convert DC power to high-frequency AC power on one side of the transformer and active secondary switching arms to rectify the high-frequency AC power to DC power on the other side of the transformer. In various embodiments, the primary and secondary active arms include high-voltage blocking capability and are composed of cascaded half-bridge cells (or submodules, HBSM) and/or cascaded full-bridge cells (or submodules, FBSM). In the present invention, the HBSMs and FBSMs are implemented using low-voltage switching devices. The DC-DC converter is be operated utilizing a control module and associated control signal in which multilevel voltage waveforms with reduced dv/dt are generated at the primary winding and secondary winding of the transformer which are phase shifted with respect to each other. The transformer's leakage inductance is used as an energy transfer element, which has the potential of reaching higher power densities. Like conventional DAB converters, soft switching can be achieved for switching devices in both the primary arm and the secondary arm of the converters. In the embodiment employing a battery energy storage system, split-battery units are integrated into the cells of the primary arms. Additionally, SOC (state-of-charge) balance of the battery units and voltage balance of the cell capacitors in the secondary arms can be easily achieved by implementing a sorting algorithm within the control module.

In an additional embodiment, when the DC inductance of the CF-MDAB embodiment becomes extremely small, such that only parasitic or stray inductances remain, the overlap or shoot-through operating principle of the CF-MDAB can no longer be applied to control the DC current. As such, when the DC current controllability has been lost and the DC-side duty cycle is fixed at 0.5, then it is necessary to regulate the DC current using AC-side indirect control. Additionally, in this situation, the DC fault ride-through has to be realized through a rectification mode with the assistance of an AC inductance.

Figure 15:
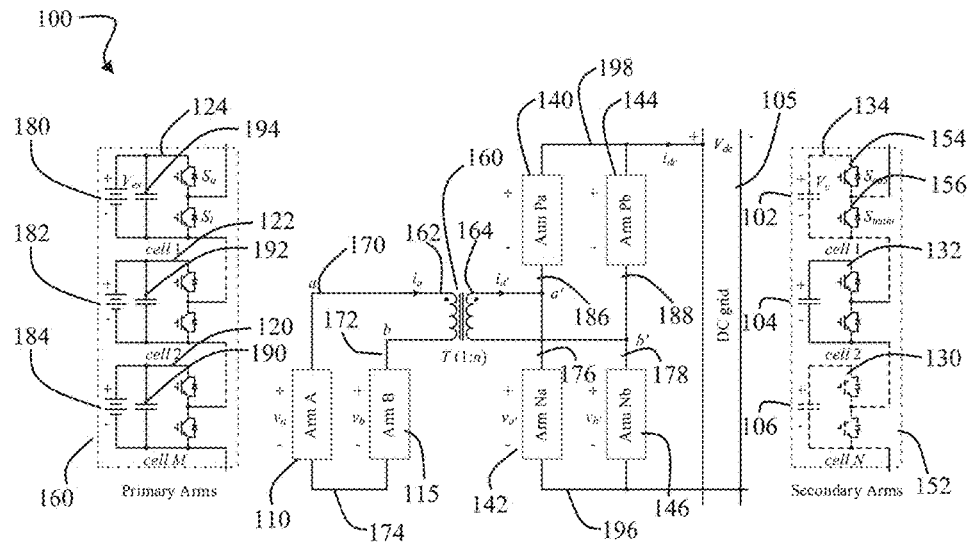
FIG. 15 is a schematic circuit diagram of a single-phase modular multilevel dual-active-bridge converter having half-bridge cells, in accordance with an embodiment of the present invention.

With reference to FIG. 15, in an additional embodiment of the present invention, a voltage-fed MDAB is described which regulates the DC current using AC-side indirect control and which realizes DC fault ride-through utilizing a rectification mode employing an AC inductance. In this particular embodiment, the DC source is a battery energy storage system (BESS).

FIG. 15 illustrates a single-phase modular multilevel DAB BESS converter 100 connected to a DC grid 105. In this exemplary embodiment, the converter 100 comprises two phase units comprising a primary arm 110, 115 each coupled to the primary winding 162 of the transformer 160 and two phase units comprising a upper arm 140, 144 and a lower arm 142, 146 each coupled to the secondary winding 164 of the transformer 160. In this embodiment, each primary arm, such as primary art 110, further comprises M half-bridge cells 120, 122, 124 in series and each secondary arm 152 further comprises N half-bridge cells 130, 132, 134 in series. Primary arm A 110 and primary arm B 115 are connected at their positive terminals to the primary winding terminals a 170 and b 172 of a single-phase transformer 160, respectively, while their negative terminals 174 are in star connection. A split-battery unit 180, 182, 184 of the battery energy storage system (BESS) and a paralleled filtering capacitor 190, 192, 194 are integrated into each cascaded cell of the primary arms 150, thereby supplying the converter 100 with a separate DC source voltage $V_{es}$ from each primary cell 120, 122, 124. In the secondary arm, the positive terminals of lower arm Na in phase a' 176 and Nb in phase b' 178 are connected to the transformer 160 secondary terminal a' and terminal b', respectively, while the negative terminals of arm Na and arm Nb 196 are both connected to the negative terminal of the DC grid 105. Similarly, the negative terminals of the upper arm Pa in phase a' 186 and the upper arm Pb in phase b' 188 are connected to the transformer 160 secondary winding terminal a' and b', respectively, while the positive terminals of arm Pa and arm Pb 198 are both connected to the positive terminal of the DC grid 105. Cell capacitors 102, 104, 106 are connected at the DC terminal in each secondary cell 130, 132, 134 to clamp the voltage and filter the current ripple during the power conversion. In particular, a device with a lower current rating can be implemented as the upper auxiliary switch $S_{aux}$ 154 in the secondary cells, compared to that of the lower main switch $S_{main}$ 156.

The switching devices in the present invention are illustrative and are not intended to limit the invention to IGBT switching devices having anti-parallel diodes. Other switching elements known in the art, such as MOSFETs, are also within the scope of the present invention.

Figure 16:
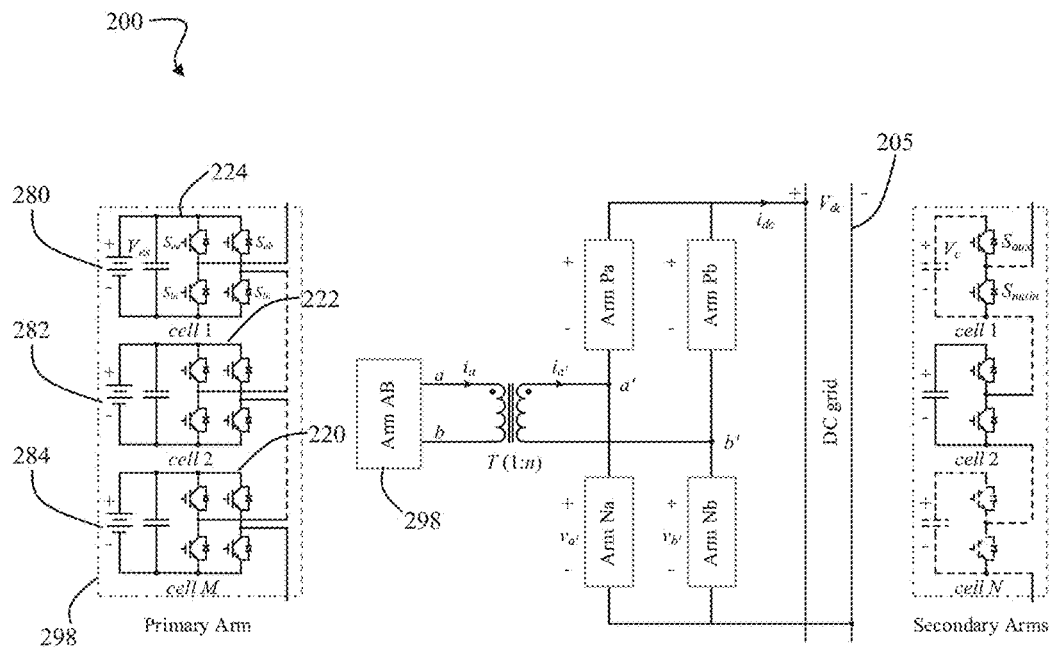
FIG. 16 is a schematic circuit diagram of a single-phase modular multilevel dual-active-bridge converter having a single full-bridge cell, in accordance with an embodiment of the present invention.

As shown with reference to FIG. 16, in an additional embodiment of the DC-DC converter 200, the two primary arms 110, 115 comprising half-bridge cells 120, 122, 124 in FIG. 15 can be integrated into a single arm 298 comprising full-bridge cells 220, 222, 224, as shown in FIG. 16. Compared to FIG. 15, the converter in FIG. 16 does not require SOC balancing control between the different primary arms, because there is only a single arm and each of the battery units 280, 282, 284 exhibits a smaller ripple current and higher ripple frequency.

Figure 17:
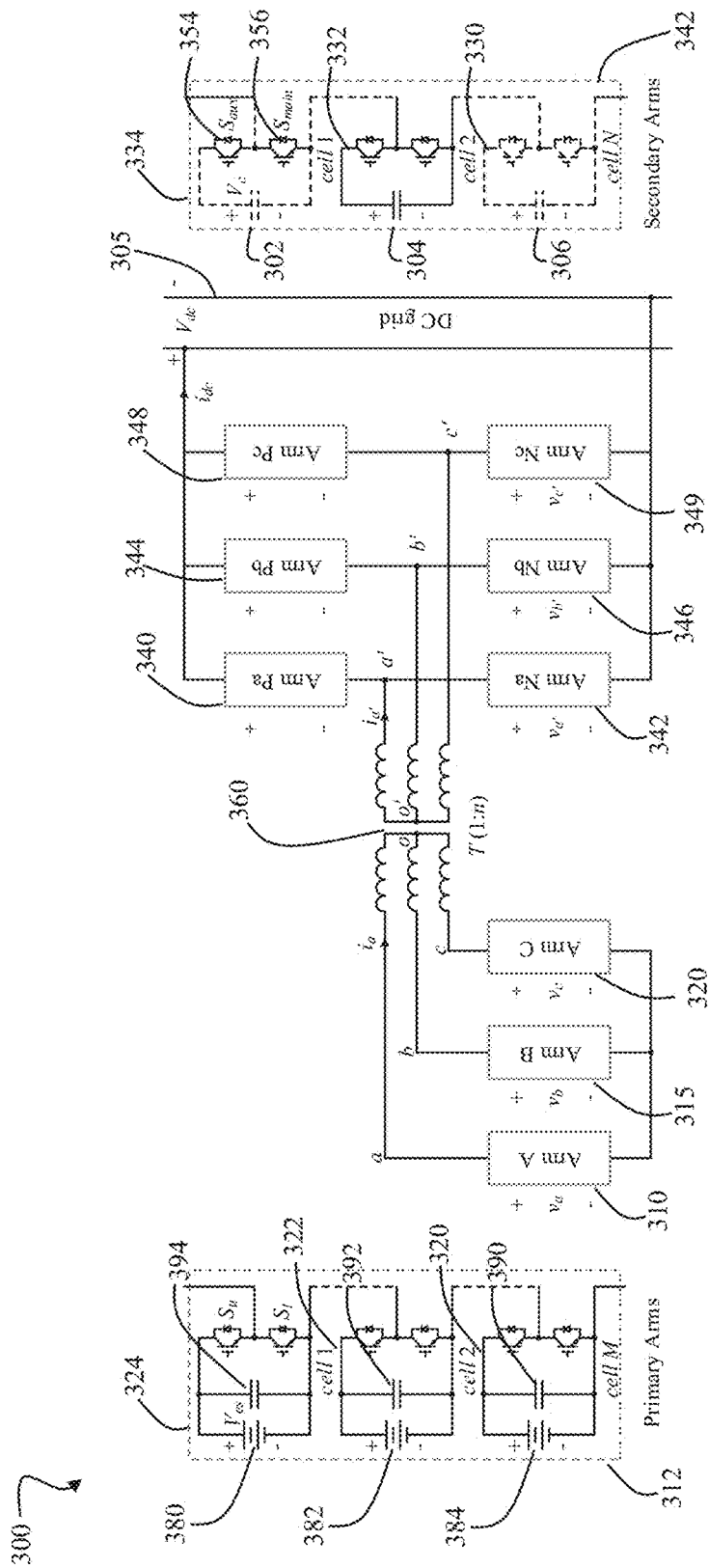
FIG. 17 is a schematic circuit diagram of a poly-phase modular multilevel dual-active-bridge converter having half-bridge cells, in accordance with an embodiment of the present invention.
Figure 18:
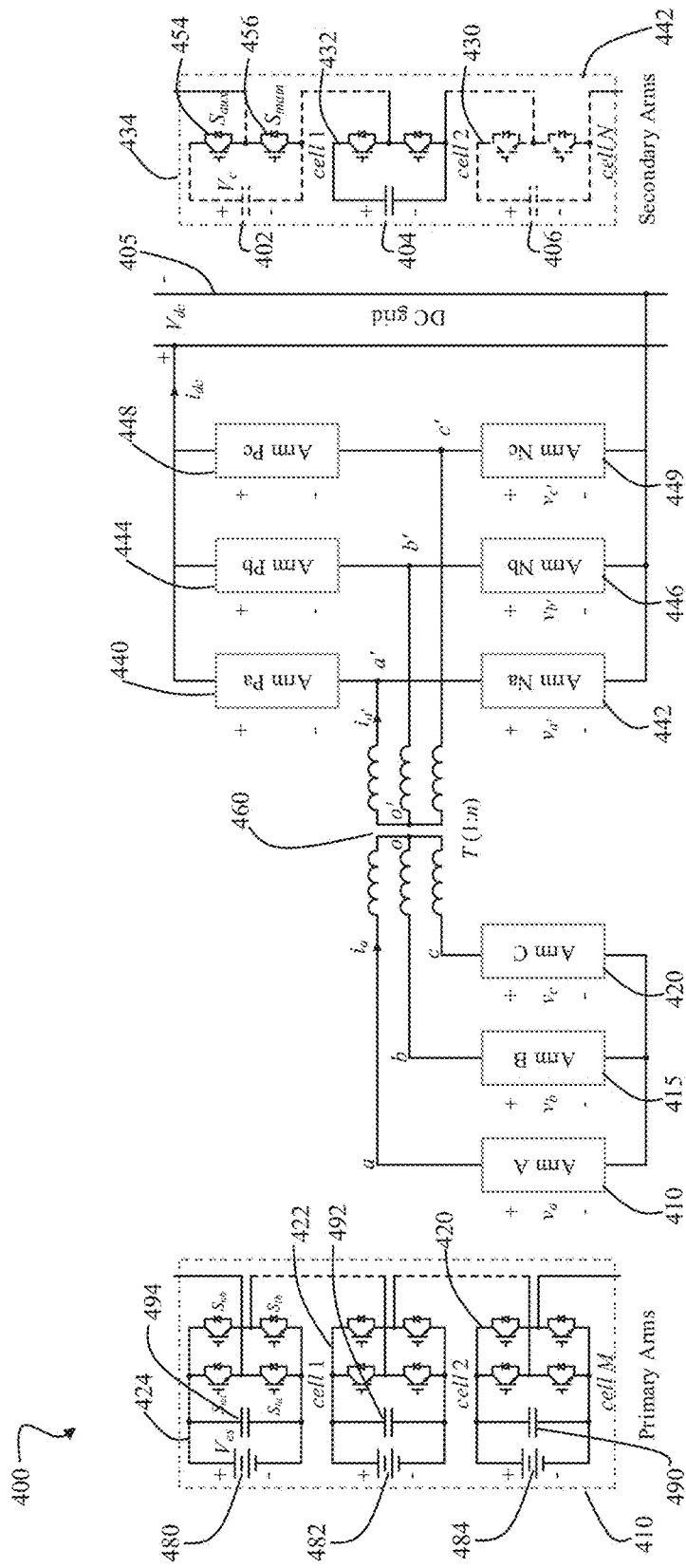
FIG. 18 is a schematic circuit diagram of a poly-phase modular multilevel dual-active-bridge converter having full-bridge cells, in accordance with an embodiment of the present invention.

In an additional embodiment, a poly-phase modular multilevel DAB converter, connecting a BESS to a DC grid is illustrated generally in FIG. 17 and FIG. 18. With reference to FIG. 17, the converter 300 utilize three phase units, each comprising an active switching arm 310, 315, 320, coupled to the primary side of the transformer 360 and three phase units, each comprising an upper arm 340, 344, 348 and a lower arm 342, 346, 349, coupled to the secondary side of the transformer 360. With reference to FIG. 4, the converter 400 utilize three phase units, each comprising an active switching arm 410, 415, 420, coupled to the primary side of the transformer 460 and three phase units, each comprising an upper arm 440, 444, 448 and a lower arm 442, 446, 449, coupled to the secondary side of the transformer 460. In the embodiment shown in FIG. 17, each active primary arm, such as primary arm 310, further comprises M half-bridge cells 320, 322, 324 coupled in series. Alternatively, in the embodiment shown in FIG. 18, each active primary arm, such as primary arm 410, further comprises M full-bridge cells 420, 422, 424 coupled in series. Additionally, in the embodiment shown in FIG. 17, each active secondary arm, such as secondary arm 342, further comprises N half-bridge cells 330, 332, 334 connected in series and in the embodiment shown in FIG. 18, each active secondary arm, such as secondary arm 442, further comprises N half-bridge cells 430, 432, 434. In FIG. 17 (FIG. 18) The primary arm A 310 (410), arm B 315 (415) and arm C 320 (420) are connected at their positive terminals to the primary winding terminals a, b and c of the symmetrical three-phase transformer 360 (460), respectively, while their negative terminals are in star connection. In FIG. 17, the battery unit, comprising a plurality of split-battery units 380, 382, 384 are each paralleled with a filtering capacitor 390, 392, 394 that are integrated into each cell of the primary arms 310, 315, 320, thereby providing a separate DC source voltage $V_{es}$ in from each primary cell 320, 322, 324 to the converter 300. In FIG. 18, the battery unit, comprising a plurality of split-battery units 480, 482, 484 are each paralleled with a filtering capacitor 490, 492, 494 that are integrated into each cell of the primary arms 410, 415, 420, thereby providing a separate DC source voltage $V_{es}$ in from each primary cell 420, 422, 424 to the converter 400. As shown in FIG. 17 (FIG. 18), in the secondary arms, the positive terminals of the lower three arms Na, Nb and Nc 342, 346, 349 (442, 446, 449), are connected to the transformer 360 (460) secondary winding terminals a', b' and c', respectively, while the negative terminals of the arms Na, Nb and Nc 342, 346, 349 (442, 446, 449) are all connected to the negative terminal of the DC grid 305 (405). Similarly, the negative terminals of the upper three arms Pa, Pb and Pc 340, 344, 348 (440, 444, 448) are connected to the transformer 360 (460) secondary winding terminal a', b' and c' respectively, while the positive terminals of the arms Pa, Pb and Pc 340, 344, 348 (440, 444, 448) are all connected to the positive terminal of the DC grid 305 (405). Capacitors 302, 304, 306 (402, 404, 406) are connected at the DC terminal in each secondary cell to clamp the voltage and filter the current during the power conversion. As previously described with reference to FIG. 17 and FIG. 18, a device with lower current rating can be implemented for the upper auxiliary switch 354 (454) compared to that of the lower main switch $S_{main}$ 356 (456).

Figure 19A:
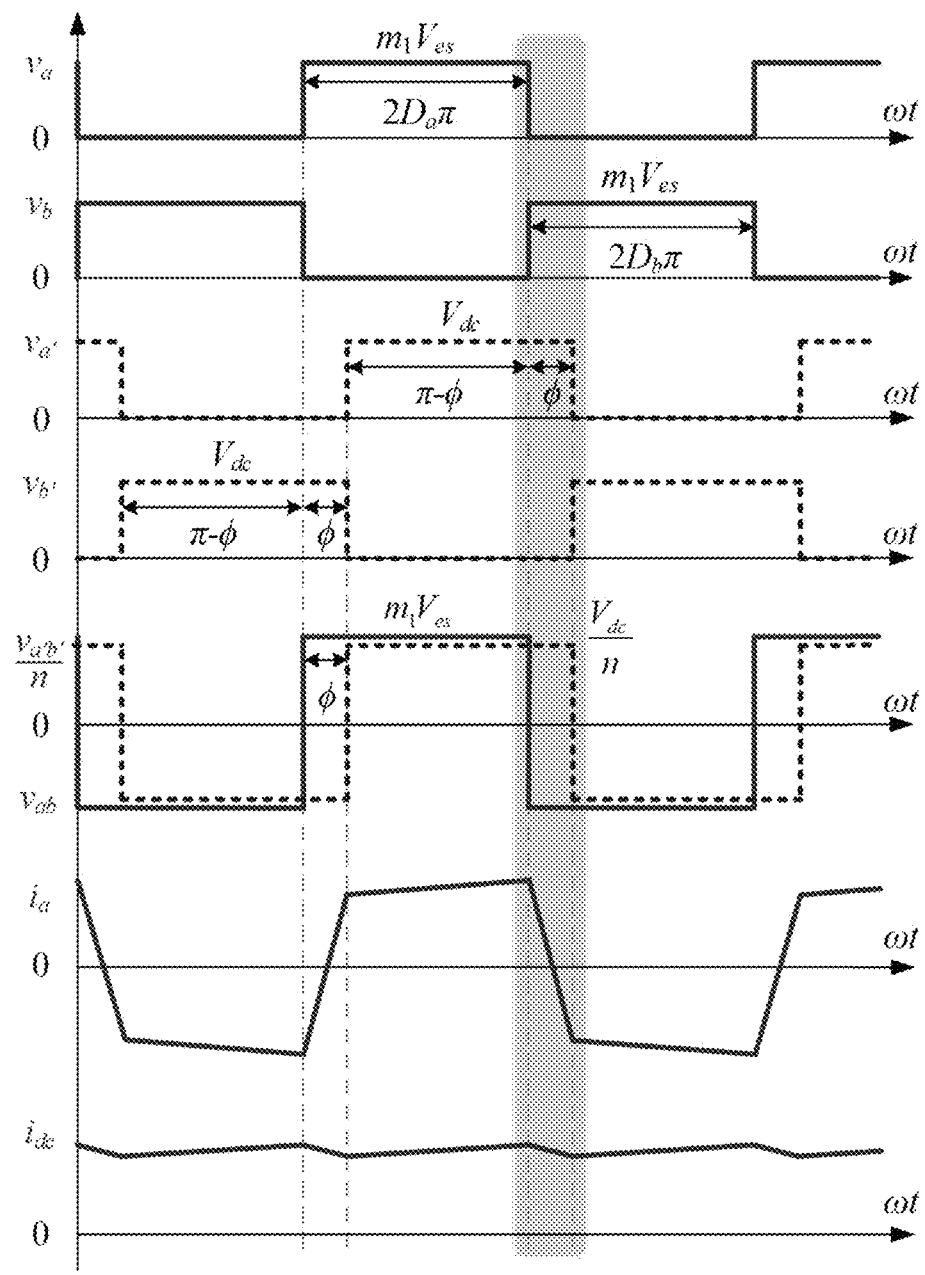
FIG. 19A is a graphical illustration of the voltage and current waveforms related to FIG. 15 and FIG. 6.
Figure 19B:
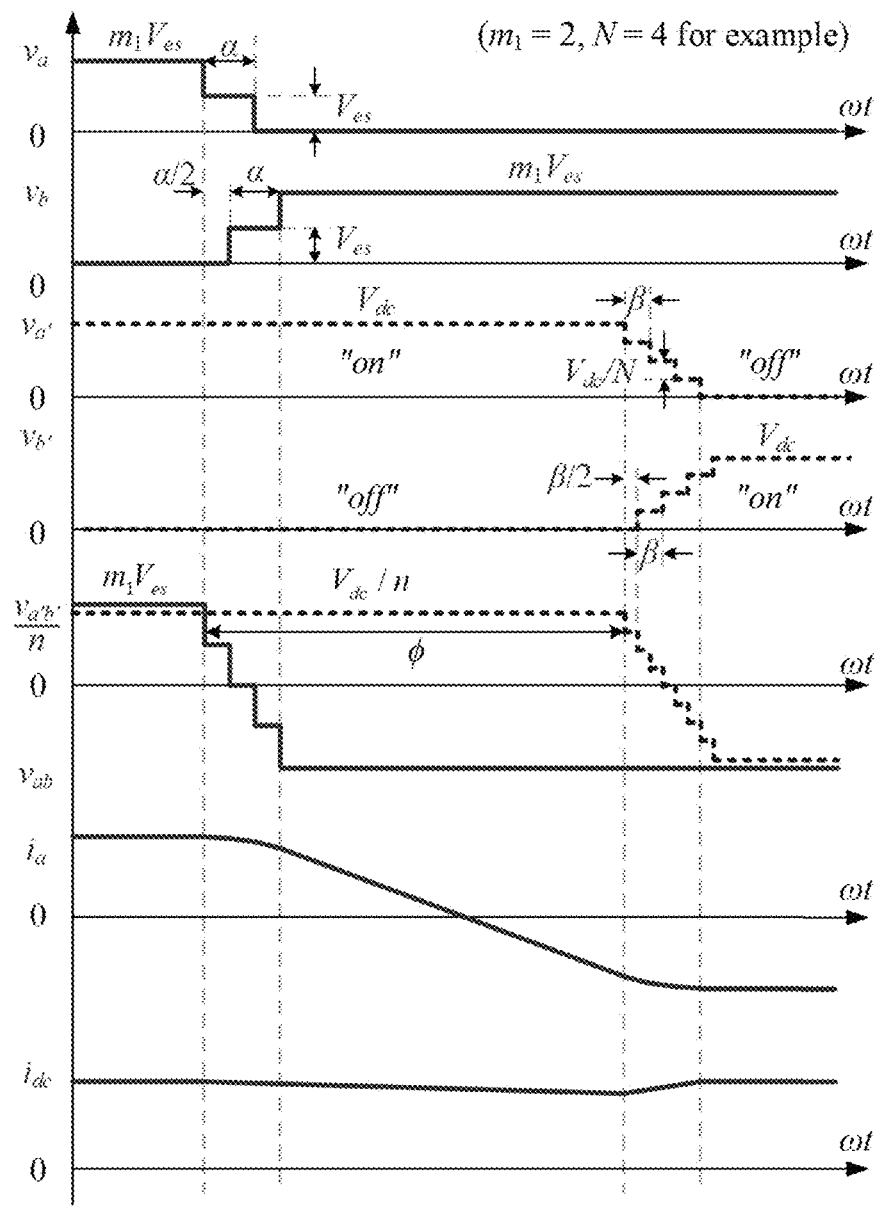
FIG. 19B illustrates an exploded view of the shaded area in FIG. 19A.

FIG. 19A illustrates the voltage and current waveforms for the embodiment of the present invention illustrated in FIG. 15 and FIG. 16, with the zoom view of the shaded portion in FIG. 19A illustrated in FIG. 19B. For simplification, the upper switch in the cells of arm A 110 of FIG. 15 and upper-left switch in the cells of arm AB 298 of FIG. 16 are denoted as $S_{ua}$. Similarly, $S_{ub}$ denotes the upper switch in the cells of arm B 115 of FIG. 15 and upper-right switch in the cells of arm AB 298 of FIG. 16. Additionally, $S_{la}$ denotes the lower switch in the cells of arm A 110 of FIG. 15 and lower-left switch in the cells of arm AB 298 of FIG. 16 and $S_{lb}$ denotes the lower switch in the cells of arm B 115 of FIG. 15 and lower-right switch in the cells of arm AB 298 of FIG. 16. In each switching cycle, there are $m_1$ ($m_1$<M) cells in a primary arm in an active state, thereby involving their cell batteries in power exchange, while the other M-$m_i$ cells are in an inactive state, wherein their batteries are bypassed from the power exchange. This switching mechanism helps to realize the charge balancing of battery units inside an arm. The modulation index for the arms is therefore defined as:

$$M_x = \begin{bmatrix} m_1 & M \\ 2D_x\pi & 2(1-D_x)\pi \end{bmatrix} m_1 < M \quad (7)$$

where $D_x$ is the turned-on duration of $S_{ux}$ during active state with respect to the switching period, x=a, b. Normally, $S_{ua}$ and $S_{ub}$ are switched complementarily, i.e. $D_a+D_b=1$. The magnitude of arm output voltage $v_a$ and $v_b$ is the sum of $m_1$ active cell voltages, which is $m_1V_{es}$, if assuming each battery unit has the same voltage $V_{es}$. To realize a quasi-square multilevel waveform in the primary arms, the $m_1$ cells are switched in a sequence wherein one cell is phase shifted after another cell by angle α which reduces dv/dt during the commutation, as shown in FIG. 19B. The upper and lower switches, namely $S_{ua}$ and $S_{la}$ or $S_{ub}$ and $S_{lb}$, are operated complementarily, while the $S_{ub}$ is π+α/2 phase shifted to $S_{ua}$, such that the level of the transformer primary voltage $v_{ab}$ is doubled, as shown in FIG. 19B. In the secondary arms, the upper and lower arms in a phase are operated complementary with a 50% duty cycle, which means an arm switches between "on" state and "off" state, representing the state that the arm voltage is $V_{DC}$ and zero, respectively. Correspondingly, the auxiliary switch $S_{aux}$ and the main switch $S_{main}$ in a cell are conducting alternatively for half switching cycle. Since each arm has to block the DC grid voltage $V_{dc}$, the nominal voltage for cell capacitors is $V_{DC}/N$. Similar to the primary side, the N cells in an arm are switched in a sequence wherein one arm is phase shifted after another by angle β which reduces dv/dt during the commutation, while phase b is π±β/2 phase shifted to phase a, such that the level of the transformer secondary voltage $v_{a'b'}$ can be doubled compared to the phase voltage $v_{a'}$ and $v_{b'}$, as is shown in FIG. 19B. By controlling the phase shift angle φ between the two multilevel voltage waveforms generated at the primary winding and the secondary winding of the transformer, the power flow can be controlled in both directions.

Figure 20A:
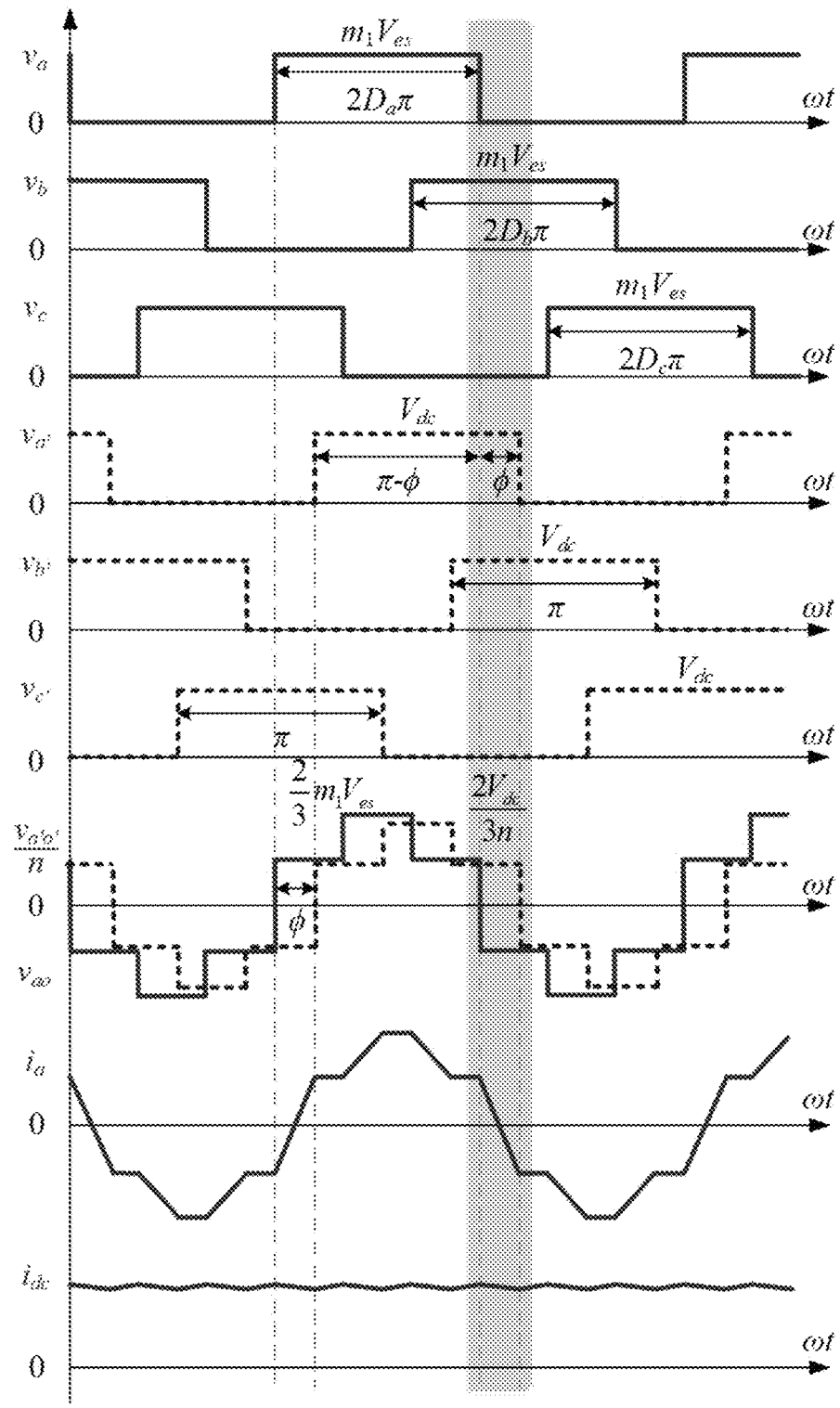
FIG. 20A is a graphical illustration of the voltage and current waveforms related to FIG. 17.
Figure 20B:
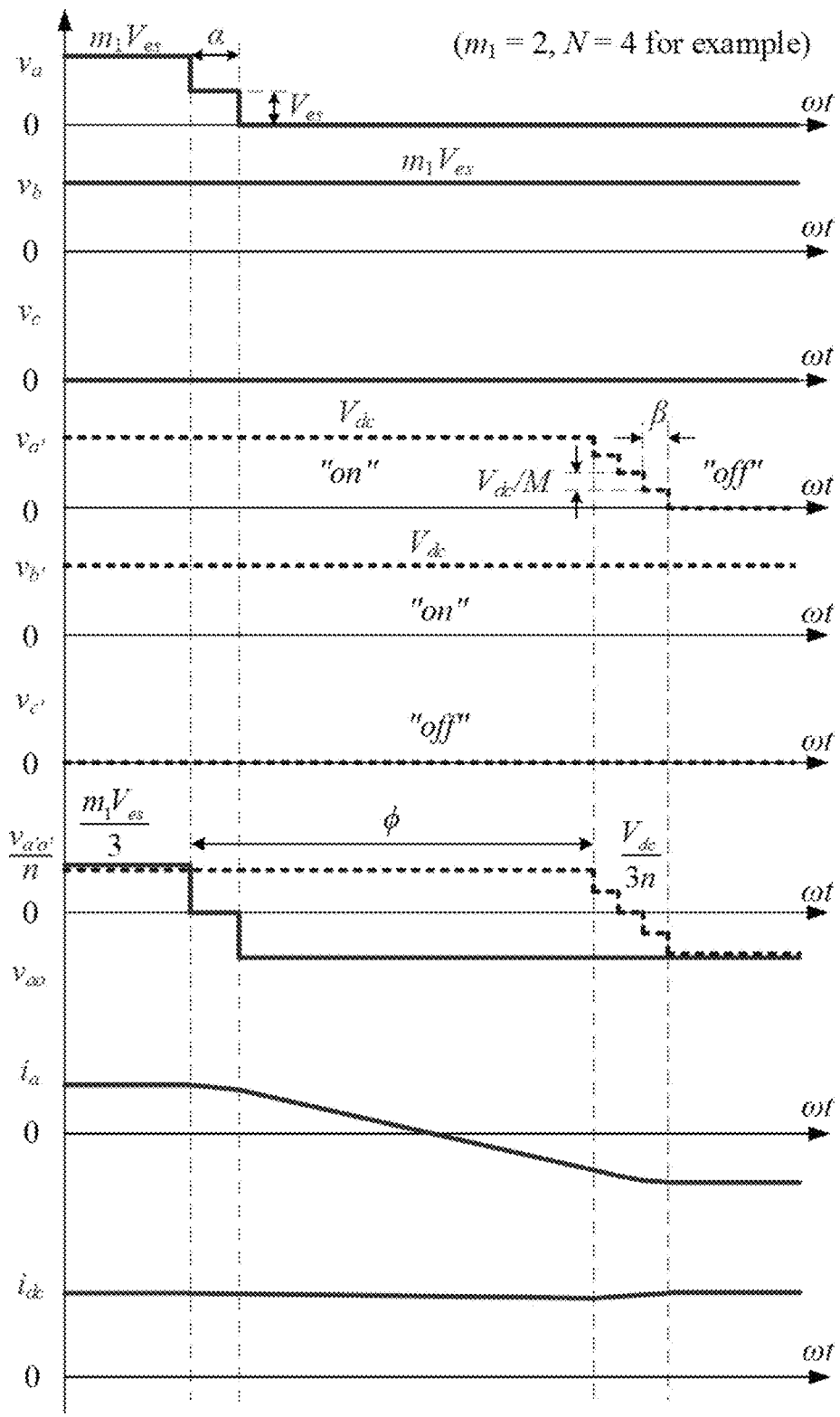
FIG. 20B illustrates an exploded view of the shaded area in FIG. 20A.

FIG. 20A illustrates the voltage and current waveforms of the embodiment of the present invention illustrated in FIG. 17, with the zoom view of the shaded portion in FIG. 20A illustrated in FIG. 20B. As a three-phase converter, the primary phases and the secondary phases are both 2π/3 shifted. Like the single-phase converter, there are $m_1$ ($m_1$<M) cells in primary arms in an active state and M-$m_1$ cells in an inactive state in each switching cycle. The modulation index $M_a$, $M_b$ and $M_c$ defined in (1) with x=a, b, and c is applied for arm A, arm B and arm C, respectively. The magnitude of arm output voltage $v_a$, $v_b$, and $v_c$ is the sum of $m_1$ active cell voltage, which is $m_1V_{es}$ if assuming each battery unit has the same voltage $V_{es}$. The $m_1$ cells in a primary arm are switched in a sequence that one is phase shifted after another by angle α, as shown in FIG. 20B. The upper and lower switches inside a cell are operating complementarily. In the secondary, the upper and lower arms in a phase are operated complementary with a 50% duty cycle, such that an arm alternates between "on" state and "off" state for half switching cycle. Correspondingly, the auxiliary switch $S_{aux}$ and the main switch $S_{main}$ in a cell are conducting alternatively for half switching cycles. The N cells in an arm are switched in a sequence that one is β angle phase shifted after another to output quasi-square multilevel voltage waveforms to reduce dv/dt during the commutation. In this embodiment, the cell capacitors' nominal voltage is $v_{DC}/N$.

Figure 21A:
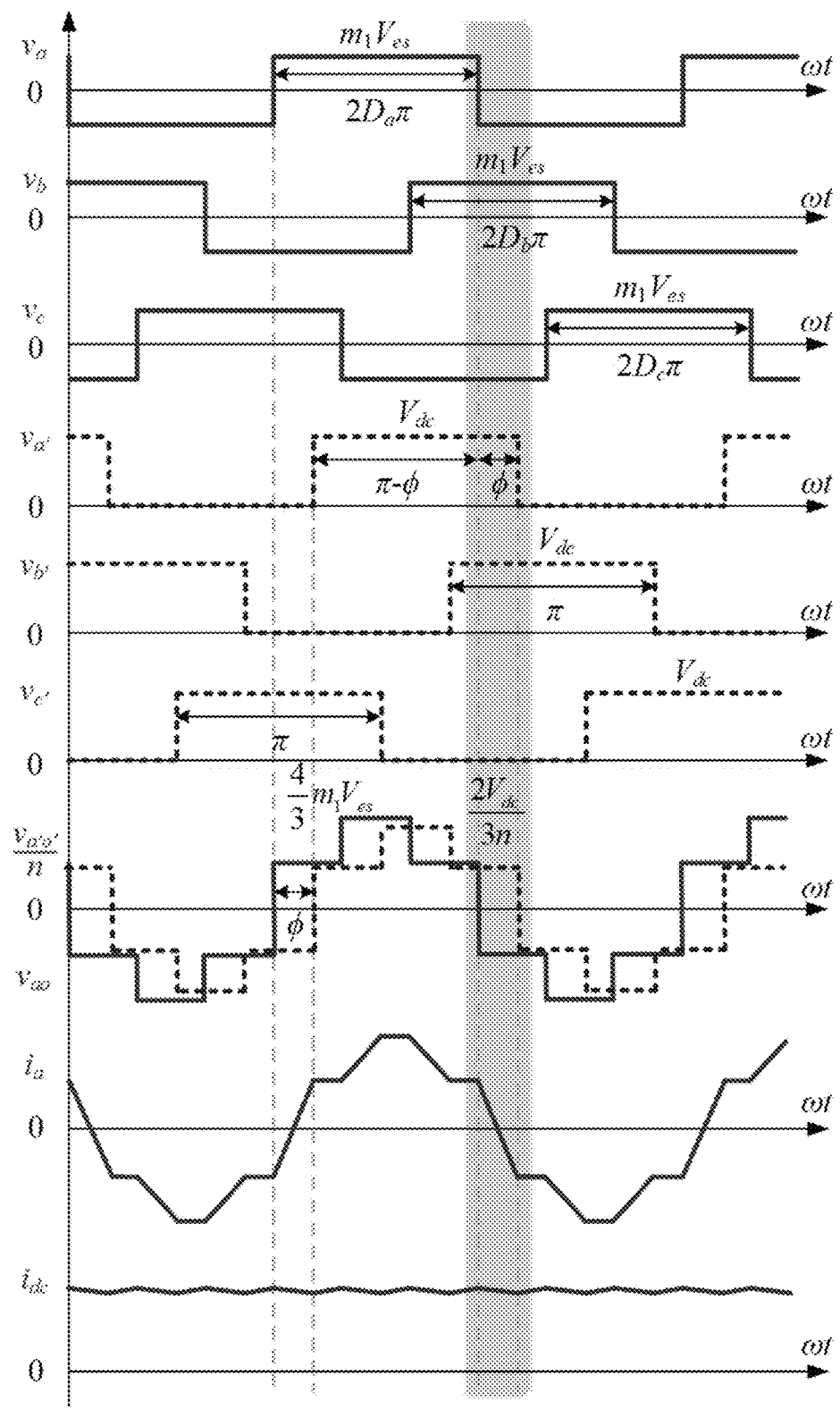
FIG. 21A is a graphical illustration of the voltage and current waveforms related to FIG. 18.
Figure 21B:
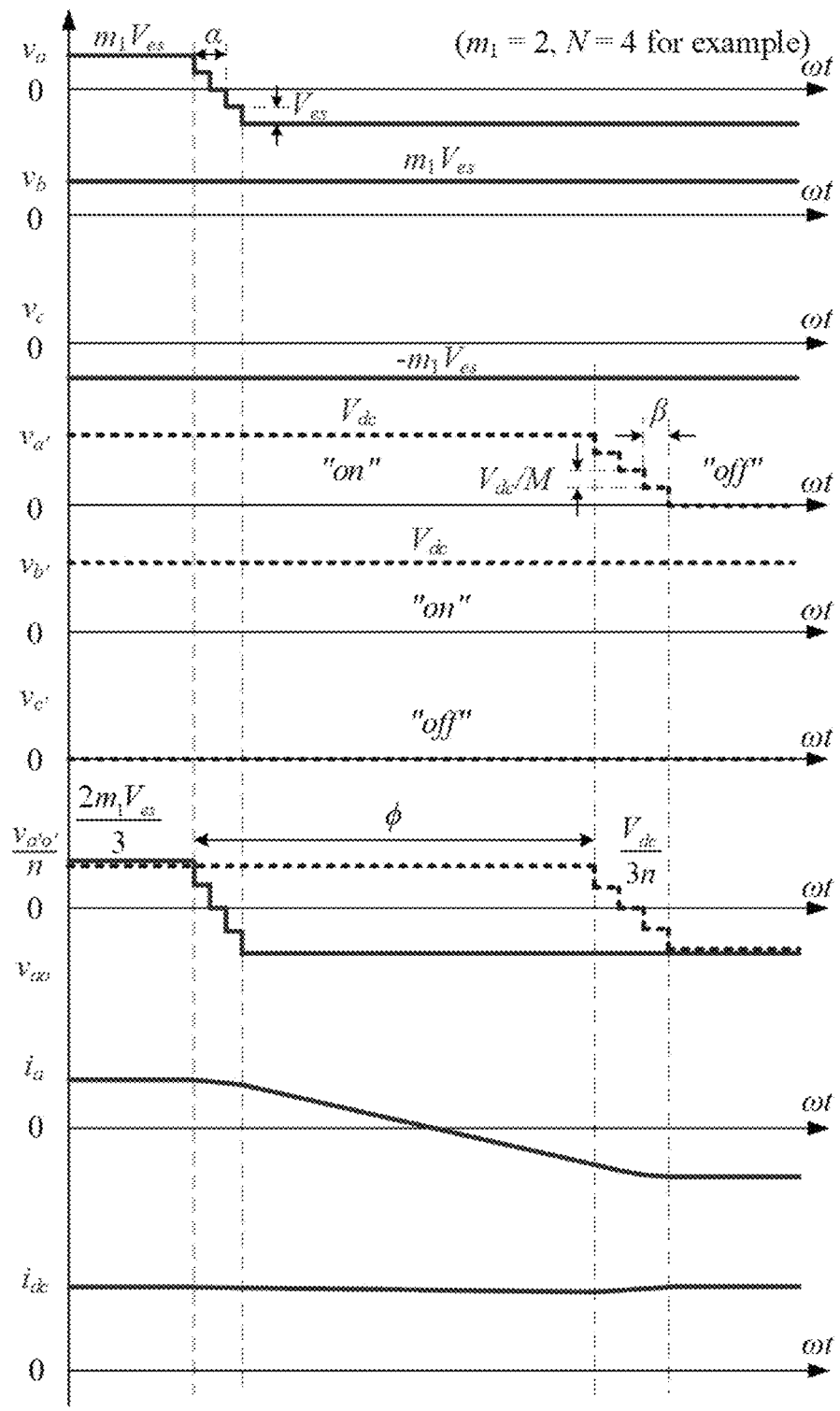
FIG. 21B illustrates an exploded view of the shaded area in FIG. 21A.

FIG. 21A illustrates the voltage and current waveforms of the embodiment of the present invention illustrated in FIG. 18, with the zoom view of the shaded portion of FIG. 21A illustrated in FIG. 21B. With full-bridge cells, the primary arms can output negative voltage, leading to doubled AC voltage magnitude at the primary of the transformer, compared to the operation shown in FIG. 20A and FIG. 20B. Applying the switching sequence illustrated in FIG. 19, the level of the transformer primary voltage during arm commutation shown in FIG. 21B is doubled, when compared to that shown in FIG. 20B.

By controlling the phase shift angle φ between the two multilevel voltage waveforms generated at the primary and secondary of the transformer, the power flow can be controlled bi-directionally for charging or discharging the battery units. The dwell time corresponding to selected α and β for the present invention should ensure an acceptable dv/dt during the commutation processing. Meanwhile, the entire switching commutation in a phase should be finished before the AC current change in polarity in order to achieve soft switching for the primary and secondary switches.

Figure 22:
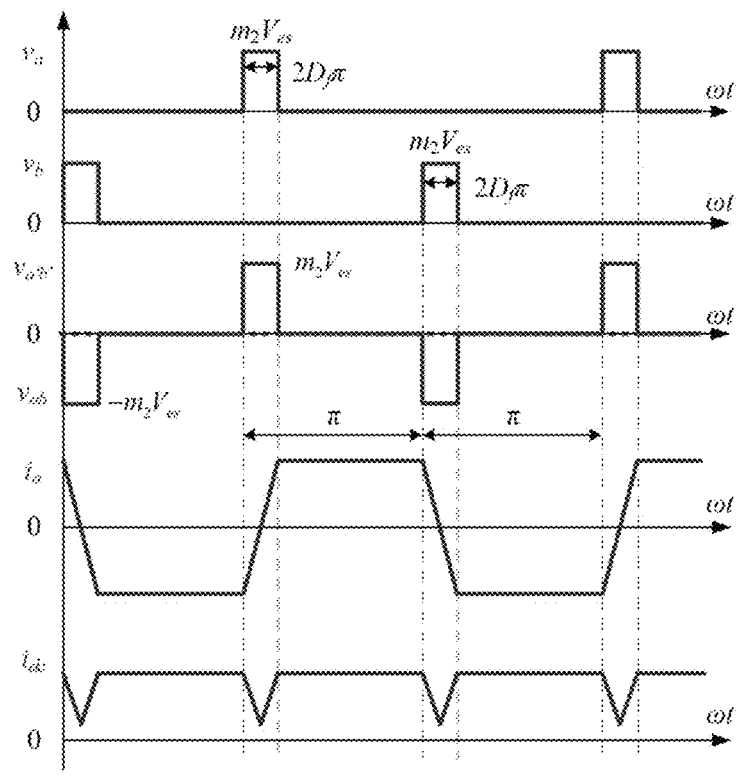
FIG. 22 is a graphical illustration of the voltage and current waveforms related to FIG. 15 and FIG. 16, under DC grid fault operation.
Figure 23:
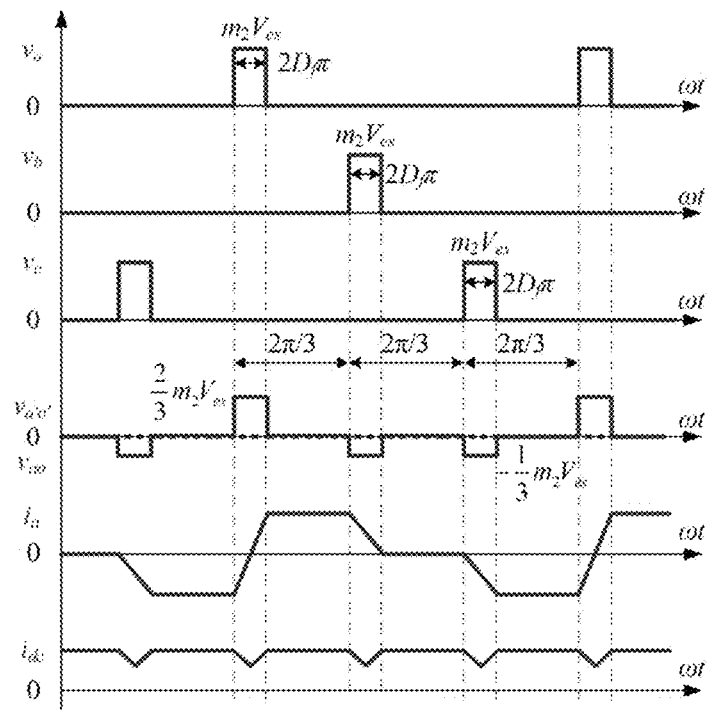
FIG. 23 is a graphical illustration of the voltage and current waveforms related to FIG. 17, under DC grid fault operation.
Figure 24:
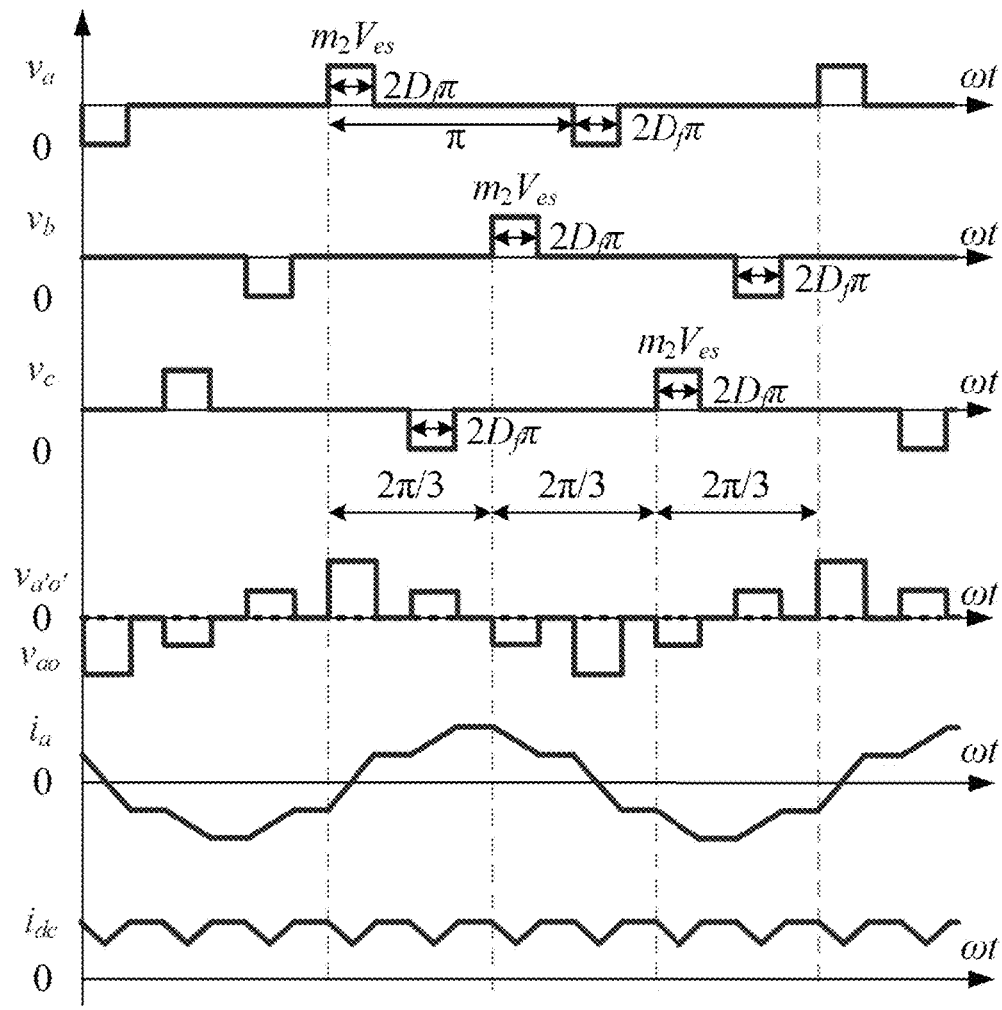
FIG. 24 is a graphical illustration of the voltage and current waveforms related to FIG. 18, under DC grid fault operation.

Fault ride-through operation under a short-duration DC grid fault is desired for the BESS system. DC fault ride-through capability requires the converter to operate continuously when a DC fault occurs, and the BESS should also be quickly restored, once the DC fault is cleared. FIG. 22, FIG. 23 and FIG. 24 show the operating waveforms under DC grid fault conditions for the present invention, in single-phase and three-phase, respectively.

In operation, when a DC fault is detected, the converter will switch into DC fault operation mode, in which the secondary devices are all blocked and the modulation indexes for the primary devices are modified. By blocking the secondary devices, the secondary circuit becomes a diode rectifier, and the energy in the cell capacitors of the secondary circuit can be retained during the DC fault. Since the DC grid voltage is almost zero, the number of cells operating in an active state is set to $m_2$, which is significantly lower than $m_1$, to compensate for the primary and secondary voltage mismatch at the transformer. In addition, the duty cycle of the primary arms are all set to $D_f$, which is relatively small, to regulate the fault current within a limit. The modulation index is therefore:

$$M_x = \begin{bmatrix} m_2 & M \\ 2D_f\pi & 2(1-D_f)\pi \end{bmatrix} \quad m_2 \ll M \quad (8)$$

For the full-bridge cells, $S_{ua}$ and $S_{ub}$ are $\pi$ phase-shifted, instead of implementing complementary switching. With proper selection of $m_2$ and $D_f$, the converter can continuously output DC current during the fault, if desired, or the converter can be fully disabled by simply blocking the primary and secondary devices at the same time. Since most energy of the cell capacitors is retained during the short duration DC fault, the converter can switch back to normal operation mode immediately after the DC grid is restored.

Simple control block diagrams for the present invention are illustrated in FIG. 25A, FIG. 25B, FIG. 26, FIG. 27, FIG. 28 and FIG. 29. The control block diagrams illustrate output DC current or power flow control, arm averaged SOC (state-of-charge) and cell SOC balancing control, secondary cell capacitor balancing control and output current control under DC grid fault.

Figure 25A:
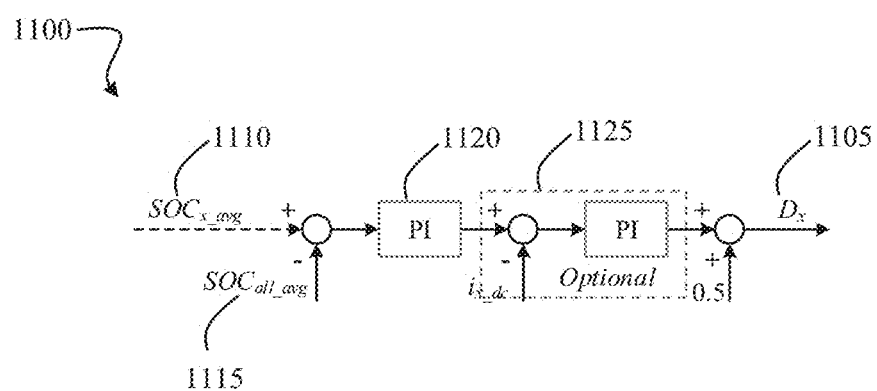
FIG. 25A is an illustration of the arm state-of-charge (SOC) balancing control diagram for the poly-phase converter of FIG. 17 using primary duty cycle with arm averaged SOC data feedback, in accordance with an embodiment of the present invention.
Figure 25B:
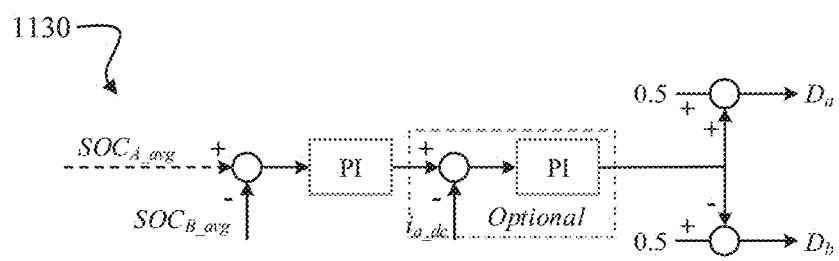
FIG. 25B is an illustration of a simplified arm SOC balancing control diagram for single-phase converter of FIG. 15 using primary duty cycle with arm averaged SOC data feedback, in accordance with an embodiment of the present invention.

FIG. 25A shows an embodiment employing a general arm averaged SOC balancing control 1100 using duty cycle $D_x$ 1105 with arm current feedback. The arm averaged. SOC, $SOC_{x\_avg}$ 1110, is regulated to follow the averaged SOC of all battery units, $SOC_{all\_avg}$ 1115, through an exemplary PT 1120 controller. In an additional embodiment, an optional inner current loop 1125 to regulate the DC component of arm current $I_{x\_dc}$ can be implemented. For the embodiment of the present invention illustrated in FIG. 15, FIG. 25A can be simplified as shown in the arm averaged SOC balancing control 1130 shown in FIG. 25B, and for the embodiment of the present invention illustrated in FIG. 16, arm averaged SOC balancing is not necessary.

Figure 26:
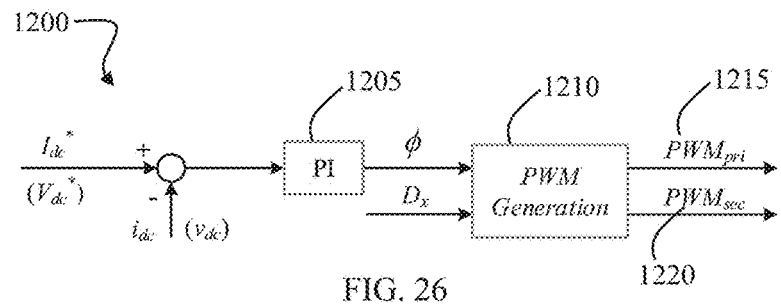
FIG. 26 illustrates the power flow control system and PWM generation diagram of the present invention using phase shift angle with DC output current or voltage feedback, in accordance with an embodiment of the present invention.

FIG. 26 illustrated a control diagram of power flow control 1200, wherein the output DC current is regulated by phase shift angle φ to follow the reference through a compensator, such as a proportion-integral controller 1205. With $D_x$ and φ, PWM signals are generated by a PWM generation module 1210 for primary arms 1215 and secondary arms 1220, just like that for conventional dual-active-bridge converters.

Figure 27:
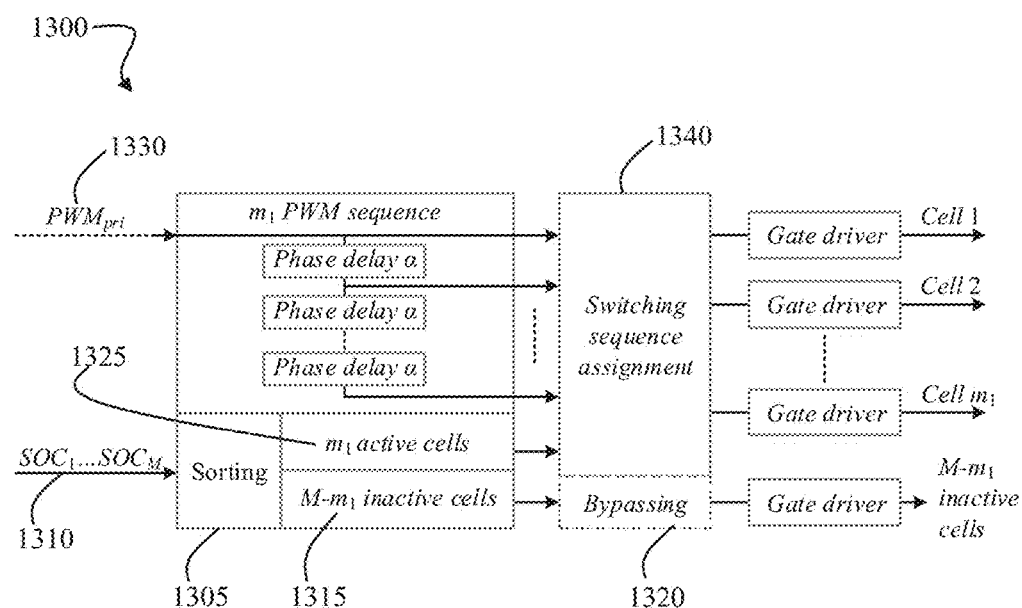
FIG. 27 illustrates the cell SOC balancing control system and primary side PWM sequence generation diagram, in accordance with an embodiment of the present invention.

In various embodiments, the cell SOC balancing is realized utilizing a sorting method 1300 as shown in FIG. 27, wherein the cell SOC in an arm 1310 is sorted 1305 every SOC balancing cycle, the $M-m_1$ cells 1315 with lowest SOC (for charging mode) or highest SOC (for discharging mode) will be set in an inactive state, thereby bypassing 1320 them from participation in the energy exchange, while the other $m_1$ cells 1325 are set in active state for energy exchange. With this mechanism, the cell SOC can be balanced. The PWM signal 1340 for active cells are generated by applying a $m_1-1$ cascaded delay block of phase angle α 1335 to the corresponding $PWM_{pri}$ signals 1330 from FIG. 27.

Figure 28:
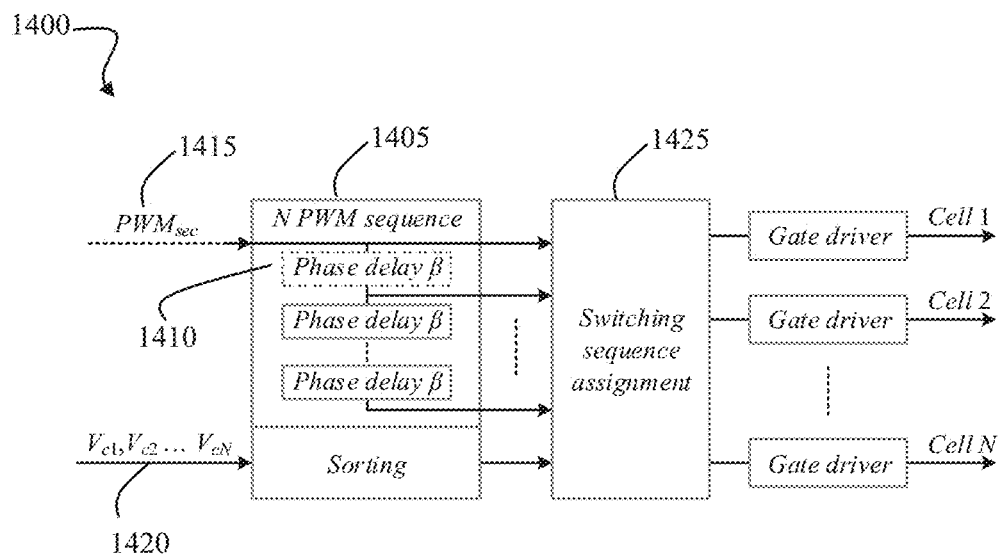
FIG. 28 illustrates the cell voltage balancing control system and secondary side PWM sequence generation diagram, in accordance with an embodiment of the present invention.

Since each secondary arm voltage is reset to the DC grid voltage $V_{dc}$, there is no need for arm voltage balancing control in the secondary. The cell voltage balancing in the secondary is achieved utilizing a sorting method 1400, as illustrated in FIG. 28. The N PWM sequence for cells in an arm 1405 are generated by applying N−1 cascaded phase delay block of β 1410 to the corresponding $PWM_{sec}$ 1415 signals from FIG. 26. In every voltage balancing cycle, the cell voltages in an arm 1420 are sorted and are paired to N PWM sequence 1425. The slight phase angle difference in cells will result in a different output power for each cell, thereby balancing the cell voltage.

Figure 29:
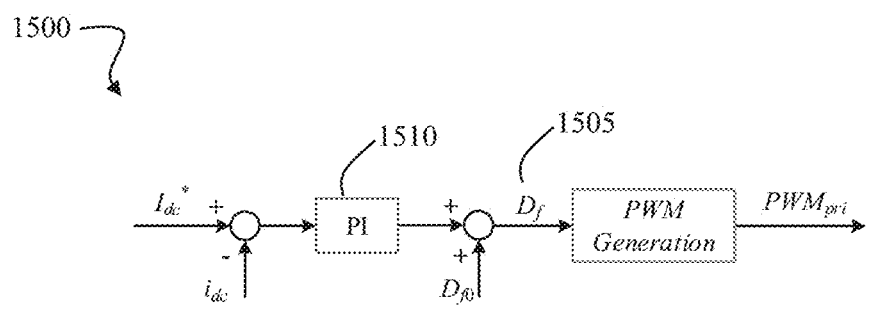
FIG. 29 illustrates an output current control diagram under DC grid fault using primary duty cycle with DC output current feedback, in accordance with an embodiment of the present invention.

FIG. 29 illustrates the control diagram 1500 for the converter under DC grid fault. In this embodiment, the secondary switches are blocked and the output DC current is regulated by primary duty cycle $D_f$ 1505 to follow the reference through a controller 1510. In an additional embodiment, a simple open loop control can be also used.

As such, in various embodiments, the present invention provides, a current-fed modular multilevel dual-active-bridge (CF-MDAB) DC-DC converter suitable for medium-voltage DC (MVDC) grid integration comprising an input stage modular converter which converts the DC input voltage to a multilevel AC voltage and supplies this voltage to a transformer. The output of the transformer is provided to an output modular converter which converts the multilevel AC to a DC output voltage or current at a controlled level. Both the input stage and output stage modular converters are composed of multiple full-bridge submodules and/or half-bridge submodules. Based on current-fed dual-active-bridge (CF-DAB) converter, the active switching devices in the submodules are switched in a soft-switched manner to minimize switching losses and increase switching frequency. The CF-MDAB converter of the present invention has direct input and output DC current control and achieves input and output DC fault ride-through operation. The converter can be implemented in single-phase or poly-phase configurations and can maintain a desired DC current under both normal and DC grid fault condition. Similar to a DAB converter, the CF-MDAB converter of the present invention offers high flexibility in configuration, e.g. input-series output-parallel (ISOP) and input-series output-independent (ISOI) connection and can be applied for battery energy storage system (BESS).

In additional embodiments, the present invention also provides a voltage-fed MDAB which regulates the DC current using AC-side indirect control and which realizes DC fault ride-through utilizing a rectification mode employing an AC inductance. In this particular embodiment, the DC source is a battery energy storage system (BESS).

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood that the invention is not limited to the particular embodiment disclosed set forth herein as illustrative, but that the invention will include all embodiments falling within the scope of the appended claims.

What is claimed is:

1. A current-fed modular multi-level dual active-bridge (CF-MDAB) DC-DC converter comprising:
   a transformer comprising a primary winding and a secondary winding;
   an input stage having DC terminals coupled to a DC grid and AC terminals coupled to the primary winding of the transformer, wherein the input stage includes a plurality of primary phase units coupled in parallel, wherein each primary phase unit comprises at least one active primary switching arm having a plurality of cascaded cells and at least one center-taped DC inductor, and wherein each of the plurality of cascaded cells comprises a plurality of switching devices and at least one capacitor coupled across the DC terminals of the cascaded cells;
   an output stage having DC terminals coupled to a DC grid and AC terminals coupled to the secondary winding of the transformer, wherein the output stage includes a plurality of secondary phase units coupled in parallel, wherein each secondary phase unit comprises a plurality of secondary switching arms having a plurality of cascaded cells and at least one center-taped DC inductor, and wherein each of the plurality of cascaded cells comprises a plurality of switching devices and at least one capacitor coupled across the DC terminals of the cascaded cells; and
   a control system coupled to each of the plurality of switching devices of the input stage and the output stage; the control system including both hardware and software components interconnected to control the input stage and the output stage to control the plurality of switching devices in a soft-switched manner to convert DC voltages to multi-level AC voltages at selected frequencies, to operate the switching devices in a normal CF-MDAB operation mode by providing duty cycle regulation in a DC loop and by providing a phase shift regulation between the multi-level AC voltages at the primary winding and the secondary winding of the transformer in an AC loop and to realize DC fault ride-through operation under a DC grid fault.

2. The CF-MDAB converter of claim 1, wherein each of the plurality of cascaded cells of the at least one primary switching arm and the plurality of secondary switching arms are configured as half-bridge cells or full-bridge cells.

3. The CF-MDAB converter of claim 2, wherein the control circuit operates the switching devices of the full-bridge cells in a half-bridge mode during a normal CF-MDAB operation mode and the control circuit operates the switching devices of the full-bridge cells in full-bridge mode to realize a DC fault ride-through under a DC grid fault.

4. The CF-MDAB converter of claim 1, wherein the input stage and the output stage are implemented by a plurality of sub-converters and wherein the plurality of sub-converters are configured an input-series output-parallel (ISOP) or an input-series output-independent (ISOI) configuration, and wherein the control system is further configured for balancing the voltage and power in the plurality of sub-converters.

5. The CF-MDAB converter of claim 1, wherein the control system further controls the plurality of switching devices to convert a DC voltage to one or more multilevel AC voltages at one or more selected frequencies and to control the plurality of switching devices to provide a phase angle difference between the one or more multilevel AC voltages at the primary winding and at the secondary winding of the transformer to yield a desired throughput power and wherein the control system further controls the plurality of switching device to provide duty cycle regulation in a DC loop.

6. The CF-MDAB converter of claim 1, wherein the transformer is selected from a single-phase transformer and a poly-phase transformer.

7. The CF-MDAB converter of claim 1, wherein each of the plurality of switching devices are selected from metal-oxide field effect semiconductor field effect transistors (MOSFET) and insulated-gate bipolar (IGBT) transistors with anti-parallel diodes.

8. The CF-MDAB converter of claim 1, wherein the DC grid is selected from a medium voltage DC (MVDC) grid and a high voltage DC (HVDC) grid.

9. The CF-MDAB converter of claim 1, wherein each of the cascaded cells of the at least one active primary arm comprises a split-battery unit of a battery energy storage system (BESS) and wherein the control system further controls the split-battery unit to convert a DC voltage from the BESS to one or more multilevel AC voltages at one or more selected frequencies and the control system further controls the plurality of switching devices to provide a phase shift regulation between the one or more multilevel AC voltages at the primary winding and at the secondary winding of the transformer to yield a desired throughput.

10. The CF-MDAB converter of claim 9, wherein the control system further controls one or more of the plurality of switching devices in the input stage and in the output stage to discharge the at least one capacitor during a DC grid fault to provide an uninterrupted throughput power.

11. A method for controlling a current-fed modular multi-level DC-DC (CF-MDAB) converter comprising a transformer comprising a primary winding and a secondary winding, an input stage having DC terminals coupled to a DC grid and AC terminals coupled to the primary winding of the transformer, wherein the input stage includes a plurality of primary phase units coupled in parallel, wherein each primary phase unit comprises at least one active primary switching arm having a plurality of cascaded cells and at least one center-taped DC inductor, and wherein each of the plurality of cascaded cells comprises a plurality of switching devices and at least one capacitor coupled across the DC terminals of the cascaded cells, an output stage having DC terminals coupled to a DC grid and AC terminals coupled to the secondary winding of the transformer, wherein the output stage includes a plurality of secondary phase units coupled in parallel, wherein each secondary phase unit comprises a plurality of secondary switching arms having a plurality of cascaded cells and at least one center-taped DC inductor, and wherein each of the plurality of cascaded cells comprises a plurality of switching devices and at least one capacitor coupled across the DC terminals of the cascaded cells and a control system coupled to each of the plurality of switching devices of the input stage and the output stage, the control system including both hardware and software components interconnected to control the input stage and the output stage: the method comprising, operating the control system to control the plurality of switching devices in a soft-switched manner to convert DC voltages to multi-level AC voltages at selected frequencies, to operate the switching devices in a normal CF-MDAB operation mode by providing duty cycle regulation in a DC loop and by providing a phase shift regulation between the multi-level AC voltages at the primary winding and the secondary winding of the transformer in an AC loop and to realize DC fault ride-through operation under a DC grid fault.

12. The method of claim 11, wherein each of the plurality of cascaded cells of the at least one primary switching arm and the plurality of secondary switching arms are configured as half-bridge cells or full-bridge cells, and wherein the method further comprises operating the control system to operates the switching devices of the full-bridge cells in a half-bridge mode during a normal CF-MDAB operation mode and the control circuit operates the switching devices of the full-bridge cells in full-bridge mode to realize a DC fault ride-through under a DC grid fault.

13. A voltage-fed modular multi-level DC-DC (VF-MDAB) converter comprising:
   a transformer comprising a primary winding and a secondary winding;
   an input stage having DC terminals coupled to a DC voltage source and AC terminals coupled to the primary winding of the transformer, wherein the input stage includes at least one active primary switching arm having a plurality of cascaded cells and wherein each of the plurality of cascaded cells comprises a plurality of switching devices and at least one capacitor coupled across the DC terminals of the input stage;
   an output stage having DC terminals coupled to a DC grid and AC terminals coupled to the secondary winding of the transformer, wherein the output stage includes a plurality of secondary switching anus having a plurality of cascaded cells and wherein each of the plurality of cascaded cells comprises a plurality of switching devices and at least one capacitor coupled across the DC terminals of the output stage; and
   a control system coupled to each of the plurality of switching devices of the input stage and the output stage, the control system including both hardware and software components interconnected to control the input stage and the output stage to control the plurality of switching devices to realize DC fault ride-through operation under a DC grid fault by disabling the operation of all of the plurality of switching devices in the output stage and disabling the operation of one or more of the plurality of switching devices in the input stage to reduce a voltage mismatch at the primary winding and the secondary winding of the transformer during the DC grid fault.

14. The VF-MDAB converter of claim 13, wherein the control system further controls the plurality of switching devices to convert a DC voltage from the DC voltage source to one or more multilevel AC voltages at one or more selected frequencies and to control the plurality of switching devices to provide a phase shift regulation between the one or more multilevel AC voltages at the primary winding and at the secondary winding of the transformer to yield a desired throughput power.

15. The VF-MDAB converter of claim 13, wherein the transformer is selected from a single-phase transformer and a poly-phase transformer.

16. The VF-MDAB converter of claim 13, wherein each of the plurality of switching devices are selected from metal-oxide field effect semiconductor field effect transistors (MOSFET) and insulated-gate bipolar (IGBT) transistors with anti-parallel diodes.

17. The VF-MDAB converter of claim 13, wherein the DC grid is selected from a medium voltage DC (MVDC) grid and a high voltage DC (HVDC) grid.

18. The VF-MDAB converter of claim 13, wherein the DC voltage source is a battery energy storage system (BESS) and wherein each of the cascaded cells of the at least one active primary switch arm comprises a split-battery unit of the BESS.

19. The VF-MDAB converter of claim 13, wherein the control system further controls the plurality of switching devices in the input stage to discharge the at least one capacitor during a DC grid fault to provide an uninterrupted throughput power.

20. A method for controlling a voltage-fed modular multi-level DC-DC converter comprising a transformer comprising a primary winding and a secondary winding, an input stage having DC terminals coupled to a DC voltage source and AC terminals coupled to the primary winding of the transformer, wherein the input stage includes at least one active primary switching arm having a plurality of cascaded cells and wherein each of the plurality of cascaded cells comprises a plurality of switching devices and at least one capacitor coupled across the DC terminals of the input stage, an output stage having DC terminals coupled to a DC grid and AC terminals coupled to the secondary winding of the transformer, wherein the output stage includes a plurality of secondary switching arms having a plurality of cascaded cells and wherein each of the plurality of cascaded cells comprises a plurality of switching devices and at least one capacitor coupled across the DC terminals of the output stage and a control system coupled to each of the plurality of switching devices of the input stage and the output stage, the control system including both hardware and software components interconnected to control the input stage and the output stage: the method comprising, operating the control system to control the plurality of switching devices to realize DC fault ride-through operation under a DC grid fault by operating in a rectification mode at the DC grid by disabling the operation of all of the plurality of switching devices in the output stage and disabling the operation of one or more of the plurality of switching devices in the input stage to reduce a voltage mismatch at the primary winding and the secondary winding of the transformer during the DC grid fault.

* * * * *

UNITED STATES PATENT AND TRADEMARK OFFICE
CERTIFICATE OF CORRECTION

Page 1 of 1

PATENT NO. : 9,893,633 B1
APPLICATION NO. : 15/467738
DATED : February 13, 2018
INVENTOR(S) : Hui Li and Yuxiang Shi It is certified that error appears in the above-identified patent and that said Letters Patent is hereby corrected as shown below:

In the Claims

Column 24, Claim 13, Line 41 should read:
plurality of secondary switching arms having a plurality Signed and Sealed this
Twenty-second Day of May, 2018

Andrei Iancu
*Director of the United States Patent and Trademark Office*